United States Patent [19]
Roberts et al.

[11] Patent Number: 5,914,055
[45] Date of Patent: Jun. 22, 1999

[54] ROTOR REPAIR SYSTEM AND TECHNIQUE

[75] Inventors: Blaine W. Roberts; William H. Zielke, both of Chattanooga; Arun Puri, Signal Mountain, all of Tenn.; Michael Jirinec, Dacula; Frank Novak, Atlanta, both of Ga.

[73] Assignee: Tennessee Valley Authority

[21] Appl. No.: 09/065,886

[22] Filed: Apr. 24, 1998

Related U.S. Application Data

[63] Continuation-in-part of application No. 08/748,734, Nov. 18, 1996.

[51] Int. Cl.⁶ .................................................... B23K 9/04
[52] U.S. Cl. .............................. 219/76.15; 219/137 WM; 228/119
[58] Field of Search ............................ 219/76.12, 76.14, 219/76.15, 137 WM, 137 R, 60 R, 61, 74, 75; 29/889.1, 889.2, 889.21; 416/241 R; 228/119

[56] References Cited

U.S. PATENT DOCUMENTS

| | | | |
|---|---|---|---|
| 2,902,587 | 9/1959 | Bernard | 219/74 |
| 3,125,666 | 3/1964 | Gorman et al. | 219/74 |
| 3,875,364 | 4/1975 | Boyett | 219/74 |
| 4,536,634 | 8/1985 | Nawa et al. | 219/74 |
| 4,710,103 | 12/1987 | Faber et al. | 29/889.21 |
| 4,897,519 | 1/1990 | Clark et al. | 219/76.14 |
| 4,903,888 | 2/1990 | Clark et al. | 29/889.1 |
| 4,958,431 | 9/1990 | Clark et al. | 29/889.1 |
| 5,003,150 | 3/1991 | Stricklen | 219/75 |
| 5,591,363 | 1/1997 | Amos et al. | 219/76.12 |
| 5,704,765 | 1/1998 | Amos et al. | 219/76.12 |

*Primary Examiner*—Clifford C. Shaw
*Attorney, Agent, or Firm*—Sughrue, Mion, Zinn, Macpeak & Seas, PLLC

[57] ABSTRACT

A system for repairing worn, distorted, cracked, or degraded portions of high temperature rotors such as those used in high-pressure and reheat steam turbines is disclosed. The repairs are applicable to low alloy steels generally described in ASTM Specification A-470 classes 3, 7, and 8. Explicit controls on the welding process, the welding consumables, and the placement of the weld fusion line are disclosed. For the welding process, a novel staging of the "relative heat input" for applying the initial cold wire gas tungsten arc weld (GTAW) buttering layer is disclosed. Significantly, the optimum weldment properties are achieved in the cold wire GTAW by utilizing a lower heat input for the crucial second layer relative to the first layer. Faster deposition or weld build-up is achieved over the buttering layer by applying the balance of welding through utilization of the hot-wire GTAW process. Hot-wire weld integrity is assured by control of a helium-argon cover gas mixture, application of a trailing gas shroud, weld-head oscillation, and control of the wire insertion point into the molten puddle. For the weld deposit, a specially modified 9Cr-1Mo filler metal based on the "Grade 91" alloy developed by the Oak Ridge National Laboratory is selected. Additional stringent controls are placed on the chemical composition of the weld wire. Finally, judicious placement of the weld fusion line to insure long service is achieved by a detailed finite-element stress analysis. Near the fusion line, the stresses are limited to values below the minimum stress-rupture strength of the base metal as described by a correlation using the Larson-Miller time-temperature parameter.

48 Claims, 11 Drawing Sheets

ROTOR REPAIR SYSTEM AND TECHNIQUE

This application is a continuation-in-part of application Ser. No. 08/748,734, filed Nov. 18, 1996 for IMPROVED ROTOR REPAIR SYSTEM AND TECHNIQUE.

INTRODUCTION

The present invention relates to methods and means for effecting new and improved welding procedures and processes for repairing rotating shafts. Large rotating shafts are used in many industrial applications such as, for example, fans, pumps, and high, intermediate, and low pressure steam turbine rotors. These large rotating shafts are commonly used by modern electric utility companies in steam and gas turbines and in the generators which are driven by such turbines to produce electricity.

The rotors of many steam and gas turbines often contain minor defects in the original forging material and operate at relatively high temperatures and pressures. In addition to high pressures and high temperatures, these large rotating shafts are also exposed to boiler steam chemistry, vibration/misalignment and other mechanical stresses. These combinations of high pressure, temperature, stress and minor original defects can result in the cracking or deformation of the rotor shafts and blade attachment regions.

In addition to cracking, another major problem which tends to shorten the useful life of rotating equipment of the type supra, is excessive wear in certain portions of the rotor. In the context of this disclosure, "wear" is used generically and includes conditions of degradation which impair future serviceability of the rotor. Such conditions of wear include, but are not limited to: a) loss of surface metal from abrasion, impingement of foreign objects, oxidation, or general corrosion, b) permanent deformation or distortion, c) localized corrosion such as pits or grain-boundary attack, and d) cracking. In particular, it will be appreciated that in high temperature steam turbines, the rotor wheels or discs nearest-most to the inlet steam, usually the control stage(s), are exposed to the highest temperatures in comparison with other wheels on the rotor. Accordingly, these discs, including the plethora of blades attached thereto, as well as the steeples which are attached to the disc and hold the blades, are prone to wear over a period of time. In the context of this disclosure, "steeple" is used generically to cover all configurations of blade attachments to the rotor including, but not limited to, axial entry fir tree, tangential entry fir tree, tangential entry straddle mount, tangential entry tee slot, and axially pinned. Accordingly, if a particular rotor disc or wheel exhibits excessive wear it will require either the replacement thereof or the discard of the entire rotor. A number of practitioners have attempted, some with limited degrees of success, the practice of numerous procedures wherein the particular worn surface is removed, at least in part, usually by means of turning the shaft on large lathe-like machines and cutting away the steeple area and a portion of the wheel therebeneath to produce a prepared surface, whereby subsequent weldment of material is made thereon in a buildup fashion sufficient to provide for machining of new steeples and the like.

As noted above, the useful life of these highly stressed rotor components depend greatly on their original design, the history of their service operation, the quality of the original forging, and the environment in which they operate. Current trends in the utility industry further impose additional cycling stress due to the load-following operation of said rotors which, in turn, increases their susceptibility to the occurrence of cracking at a time earlier than would be expected from the steady-state design conditions. Also, other types of damage or excessive wear can occur during service operation by the contact of the rotating component with the stationary component when a high vibration occurs or a foreign objects intrudes between the two components. As the average age of these expensive large rotating shafts increases, these damage events are becoming more frequent and the projected cost of replacement is increasing exponentially.

Accordingly, a need has long existed for new methods and means for the repair, rather than replacement of these aging units, and for high quality weld repair technology and techniques which include: (1) a complete reanalysis of the component operating conditions, (2) a reliable shortcut of effecting finite element stress and thermal analysis sans the usual requirement and expense of testing crossweld samples, and (3) means to improve metallurgical alloy and grain structure to optimize both the room temperature and operating temperature properties, the base metal heat-affected zone (hereinafter HAZ), the fusion line and the weld metal deposited thereover. Assuredly, this is a complex combination of factors which requires addressing in order to arrive at a safe, reliable, and cost-effective solution.

Since the problems befronting engineers in the refurbishing of large rotating devices of the type, supra include a number of different problems, the instant invention is more easily understood when it is realized that it comprises at least five embodiments. For instance, these embodiments may be summarized as follows:

Embodiment One. This embodiment is concerned principally with the repair of worn surfaces of rotors of the type herein described and oftentimes is directed specifically to individual wheels/discs of a particular rotor wherein a portion thereof is removed, thereby leaving a resulting prepared surface. This may include the steeple as well as a portion of the disc supporting the steeple. Subsequently, multiple layers of weld metal are laid down over the resulting prepared surface in a fashion to rebuild the worn surface back to a size sufficient to thereafter accommodate the machining thereof, whereby a reconstituted assembly of substantially the same size and silhouette as originally received, may be produced.

Embodiment Two. This embodiment is directed to the repair of rotors having a crack or other discontinuity, usually occurring transversely across the rotor wherein a section of the entire rotor is removed and a replacement substituted therefore by joining it with the portion of the original rotor segment. Thus, in the practice of this Embodiment Two, either new sections of rotor are added to replace the removed portions, or in some instances, if there is a relatively clean break or crack in a plane generally perpendicular to the rotor axis, it may be possible to machine away material from the broken surface of each rotor segment, whereby subsequent weldment buildup thereon can be utilized as a substitute for a new piece inserted therebetween.

Embodiment Three. This embodiment is directed to the buildup of substantial amounts of metal on the rotor body by hot wire gas tungsten arc welding (hereinafter hot wire) subsequent to an initial weldment thereon comprised of, usually four layers of metal deposited by cold wire gas tungsten arc welding (hereinafter cold wire), said cold wire arc welding effected with a series of stepped-down relative heat inputs used to deposit each successive layer to thereby produce a vastly improved "buttering" layer of resulting weldment. The particular alloys forged into the many large rotors now requiring repair were of compositions which require the establishment of a rather thin interface (i.e., the buttering layer) between the base metal comprising the rotor body and the subsequent layers of weldment alloy later placed thereover. This particular interface is herein referred to as the "buttering" or the "buttering layer" and requires the application of specific parameters, as will be discussed in much greater detail infra. After this interface or buttering layer is established by utilization of the instant new reduced relative heat input technique, the subsequent buildup of metal thereover by hot wire arc welding for buildup of worn surfaces on rotors or the joining of rotor segments to one another is effected in the practice of this embodiment by the employment of new, novel, and special equipment and the utilization of special techniques for ensuring the integrity of the resultant buildup weldments.

Embodiment Four. This embodiment is directed to and is concerned with the particular new weld wire alloy composition which has been developed in the making of the instant invention to ensure that both the cold wire weld buttering technique, as well as the subsequent hot wire welding buildup, supra, is of the highest integrity and produces the best possible results in terms of freedom from initial defects and long useful service life at design operating temperature.

Embodiment Five. The practice of this Embodiment Five is a prerequisite for the practice of Embodiment One, supra. Specifically it is concerned with the determination of how much material is to be removed from the worn surface thereby resulting in a prepared surface so that the best compromise may be had from the standpoint of minimizing the amount of weldment metal which needs to be added back to such prepared surface so as to provide adequate material for subsequent machining and at the same time to minimize the deleterious effects that the extreme conditions of high stress, high temperature and adverse steam boiler chemistry may have on the interface comprising the buttering area, supra, and more important the area just therebelow, to wit, the HAZ. Accordingly, this Embodiment Five concerns itself with the optimum placement of the "cut line" which later establishes the position of the fusion line effected immediately therebelow.

BACKGROUND OF THE INVENTION

1. Field of the Invention

Large rotating rotors, either solid or hollow, are used in many applications both in the utility industry and the petrochemical industry. These large rotating shafts are used in equipment which often may operate at elevated temperatures. Many of these large rotating shafts were originally produced from ASTM A-470 materials which are usually identified as Cr—Mo—V, Ni—Mo—V, or Ni—Cr—Mo—V low alloy steel materials which have been heat treated to differing strength levels for individual applications. Their use in turbines exposes these alloys to high pressures and temperatures, cycling temperature differentials, vibrations, low cycle fatigue, creep-fatigue, and possibly high cycle fatigue problems during the normal course of rotor service operation. In addition to high pressures and high temperature wherein shaft temperatures usually exceed 500° F., certain high stress blade attachment sections thereof operate on a continuous basis at temperatures at or exceeding 950° F. These large rotating shafts are also exposed to the hostile environments of boiler steam, as well as being subjected to vibration/misalignment and other mechanical stresses. Also, these rotor shafts, or simply "rotors," typically contain a myriad of small minors defects resulting from the original casting and forging processes. These combinations of temperatures, stresses and minor defects can influence the cracking or deformation in such rotors.

The Cr—Mo—V, Ni—Mo—V, and Ni—Cr—Mo—V low alloy steels, commonly used in these rotors, have generally provided fairly good high temperature fatigue and creep properties. However, owing to limitations in the original manufacturing process, forty year old design limitations, instrumentation limitations, and operation limitations, the higher stress areas of some of these rotors are the first to distort or crack.

More important, the sections of these rotors which operate at temperatures over 800° F. for times often exceeding 200,000 hours operate in the creep range. Creep is a phenomenon wherein permanent deformation occurs over a long period of time. Metallurgically, creep results in grain boundary separation, microcracking, visible cracking and finally component failure for low alloy steels. This problem is exacerbated by the thermal cycling that occurs during normal operation and which causes a complex interaction of creep and fatigue. Current utility trends to practice load-following causes additional cycling of their generating units which also increases the susceptibility to have cracking or deformation occur in the rotors thereof sooner than would have been expected from the original design operating conditions. Even when operating within the design envelope, the average age of many electric utility rotors is now approaching 40 years. Accordingly, these rotors are now operating essentially beyond their originally intended design life. Nonetheless, the cost to replace them would be extremely prohibitive as a normal method of operation in today's competitive market.

Accordingly, a real need has long existed for high quality weld repair methods and means which include a complete reanalysis of the component operating conditions to optimize the room temperature and operating temperature mechanical properties of the rotor base metal, the HAZ, the proper location of the so-called fusion line, and techniques for deposit of the buttering layer on the prepared rotor surface juxtaposed the fusion line as well as the metal buildup thereover and the alloy used therefore.

2. Description of the Prior Art

Large rotating shafts made from ASTM A-470 type alloys are considered difficult to weld. This difficulty is attributed mainly to their rather high carbon content, which is inherently necessary in order to produce adequate strength, and the unintended high levels of residual elements which were characteristic of steel making practices in the 1950's and 1960's. In spite of the welding difficulties the high cost associated with the alternative of replacement of these critical components has led to the development of many different, albeit, less than totally successful weld procedures for effecting such repairs.

For ease of understanding and convenience to the reader the following description of numerous prior art references and teachings has been organized, as far as was possible, into the sequence and arrangement of Embodiments One through Five discussed, supra.

Embodiment One—Repair of Worn Rotor Surfaces. One of the earlier patents dealing with the repair of worn surfaces on rotor body is found in U.S. Pat. No. 4,710,103, Faber et al., Dec. 1, 1987, wherein is disclosed a rotor body having an outer layer deposited thereon by means of one or more welding runs and wherein that outer layer is subsequently machined into, for example, steeples for purposes of receiving blades, which blades are subsequently inserted thereinto.

Although the disclosure in '103, supra is broad in scope, essentially the same disclosure was published at an earlier date, to wit, in April 1984 [Amos, D. R. and Clark, R. E., *Reparation de soudures pour rotors de turbines,* IIW Doc. XII-844-84, April 1984 (Technical Welding Institute, Abington Hall, Abington, Cambridge, UK)].

In a somewhat later disclosure Clark et al. in U.S. Pat. Nos. 4,897,519, Jan. 30, 1990, and 4,958,431, Sep. 25, 1990, disclose a method for repairing worn surfaces of Cr—Mo—V steam turbine components. A critical feature disclosed and claimed by Clark et al. is the procedure of depositing the ferrous alloy on worn surfaces in a multipass buildup comprising at least two spaced apart weld beads. As the rotor is turned beneath the welding torch for deposit of weld metal thereon and in a manner transverse to the rotor body the first weld bead is laid down in a first position and the second pass over the rotor body, instead of being laid down juxtaposed to the first weld bead is spaced apart essentially a substantial distance therefrom and thereafter the spaced apart procedure is continued presumably to maximize the heat sink characteristic of the rotor body. Although this spaced apart procedure might be desirable on very small rotors wherein very limited heat sink characteristics are available, it has been found that for large rotors of the type herein described and disclosed ranging from about 20 inches or larger in diameter, the heat sink available by such a large mass of metal renders this particular procedure of Clark et al. both unnecessary and inadvisable in that such a spaced apart arrangement of beads has been found to contribute to welding defects brought about due to lack of proper fusion including with the side wall of the adjacent bead.

In another procedure disclosed again by Clark et al. in U.S. Pat. Nos. 4,903,888, Feb. 27, 1990, and 4,940,390, Jul. 10, 1990, therein is taught the repair of worn surfaces on relatively low alloy, low chromium rotors wherein is disclosed a specialized tempering procedure effected on the HAZ, which HAZ in the region of the outer periphery of the rotor surface at and just below the fusion line formed by the first weldment layer deposited thereon. In this procedure of Clark et al., the tempering of the HAZ is effected by a reheating thereof to relieve internal stress and reduce hardness as well as overcoming the coarse grain structure effected in the HAZ by the first layer of weldments juxtaposed said fusion line. The specific procedure taught by Clark et al., is to lay down their second layer of weldment material under welding conditions wherein a higher heat is used than was used to apply or deposit said first layer, said higher heat utilized during depositing of said second layer giving rise to tempering at least a portion of said HAZ in the rotor at or near its prepared surface, to wit, the fusion line. Clark et al., further teach that this application of higher heat in effecting the deposit of their second layer of weldment is further utilized during the deposit of subsequent weldments for laying down or depositing the third, fourth, and fifth layers so as to continue utilizing the higher heat input for effecting the tempering of the HAZ. As may be seen from the instant teachings, infra, the advisability of utilizing such higher subsequent welding heat inputs is questionable at best, and indeed leads those skilled in the art in a direction just opposite to the discoveries comprising the instant invention.

Embodiment Two—Repair of Severely Cracked or Otherwise Damaged Rotors. A number of patents teach numerous methods for repairing steam turbine generator rotors wherein one end of each of two rotor segments are machined for mating thereof, or one end of a rotor segment is machined for mating with the end of a replacement section and the two resulting end faces are welded to one another by any number of procedures.

One such procedure is shown by Clark et al., U.S. Pat. No. 4,633,554, Jan. 6, 1987, wherein they further provide for the procedure of boring out the center of the attached rotor segment and a portion of the original rotor segment, wherein the interface therein caused by the weldment can be inspected deep within the core of the rotor without substantially destroying the strength characteristics thereof.

In another variation of this procedure, this time by Amos et al., U.S. Pat. No. 5,172,475, Dec. 22, 1992, a rotor is severed in close proximity to a crack whereupon a weld buildup portion is deposited onto the surface adjacent the core of each of the two pieces with subsequent machining of one such buildup portion into a first mating connection and the other buildup portion machined into a second mating connection for engagement of the pieces to ensure proper alignment of the engaged rotor pieces prior to the subsequent welding thereof. Amos et al. claim that their procedure of using the two original pieces with weld buildup made on each such piece and followed by subsequent machining can substantially cut the down time of the component as compared to joining on a new replacement rotor section with one of the original rotor segments. This is understandable since a new segment would have to be specially forged and constructed to meet the physical requirements of the desired finished product.

In the instance of repairing a rotor having a rather severe crack therein Galanes in U.S. Pat. No. 5,280,849, teaches forming a narrow groove in the rotor in a fashion to substantially remove the crack, i.e., the groove is deep enough and wide enough to cut out material juxtaposed the crack, whereupon the resulting groove, after preheating, is filled with his specialized welding filler metal and later heat soaked to result in his repair.

In still another disclosure of Clark et al., in U.S. Pat. No. 4,962,586, Oct. 16, 1990, they teach the joining of two rotor segments composed of different alloys, to wit, one being of a high temperature alloy and the other being of a low temperature alloy. In the practice of their procedure they selectively clad the machined surface of the rotor segment composed of a Cr—Mo—V alloy and then, after machining for alignment with the machined end of a rotor segment comprised of a Ni—Cr—Mo—V alloy, they fill the gap therebetween with a weld filler material to result in a composite comprised of four different metal alloys with which they claim to be able to bridge the gap between their high temperature alloy rotor segment and their low temperature alloy rotor segment. The procedure in this disclosure of Clark et al. of utilizing a cladding on at least one of the two machined end pieces of the rotor is of particular interest in that the instant invention in several embodiments thereof incorporate a buttering procedure wherein either one or both of the juxtaposed end faces of aligned rotor segments are first clad or buttered with specially applied weldments prior to the use of weld filler material therebetween, which in the instant invention is the same alloy composition as the buttering material.

In a still later issued patent to Galanes, U.S. Pat. No. 5,348,212, Sep. 20, 1994, there is shown a variation of the method of his earlier disclosure wherein the same welding Cr—Mo—V filler type alloy is utilized, but instead of being deposited in a narrow groove which has first been machined out to remove a crack in the rotor, it rather is used to fill a gap formed by mating machine surfaces of two rotor segments with the added feature of forming or attaching a pilot stub to the end surface of his first shaft segment and forming a pilot hole in the opposing end surface of his second shaft segment whereby positioning the pilot stub inside the pilot hole provides for more desirable alignment of the two rotor segments.

Embodiment Three—Utilization of Special Cover Gases and Shrouding Above the Weld Puddle During Hot Wire Weldment Buildup. As noted both supra and as will be apparent from the discussion infra, after deposit of the buttering layer onto the prepared rotor surface in Embodiment One supra or the end faces of one or both of the rotor segments in Embodiment Two, supra, the positioning and deposit of most of the total weld buildup metal, either for the later machining into portions of discs including steeples or for the filling of the gap between the mating end faces of two rotor segments is accomplished by hot wire welding as opposed to the cold wire procedure necessary for the buttering operation. Due to the substantially higher operating conditions during such hot wire weld buildup, the resulting weld puddle is substantially bigger or greater in volume and particularly in the case of the application to worn surfaces of rotors extends several inches from the point of welding transversely along the periphery of the rotor or rotor wheel. During the development of the instant invention, it was discovered that the length of the weld puddle be protected from the oxygen in the atmosphere until said weld solidifies, and further until it cools from its initial solidification temperature of perhaps about 2800° F. to a temperature as low as about 800° F. in order to minimize crust formation thereon which crust can adversely interfere with the next pass of weldment by undesirable inclusions therein of foreign elements which may or may not be "floated" in the subsequent pass of a weld puddle thereover. In addition, it has now been found that although the cold wire weldments for effecting the buttering layers, supra, are preferably flooded with argon to protect their respective weld puddles from unwanted and undesirable contact with oxygen in the atmosphere, the flooding of the hot wire welding puddle requires a special mixture of argon with helium in order to produce the desired characteristics necessary in the resulting weld. For instance, it is now known that the addition of helium to the argon gas cover over the weld puddle in the right proportions effects the aspect ratio of the weld nugget (bead width to penetration depth) so that the weld bead is effectively widened and wherein improved penetration of the puddle into the previous weldment minimizes the occurrence of lack-of-fusion defects. Although gas flooding or as herein termed "covering" of the weld puddle is inherently effected by the very nature of arrangements such as gas tungsten arc welding. However, the instant invention comprises further refinements comprising the instant invention whereby a shroud is utilized for further containing the cover gas over substantially all of the weld puddle and metal contiguous thereto and further wherein cover gas added at the situs of the arc comprises a mixture of helium with argon and, further wherein a unique arrangement of cover gases introduced in a particular sequence over the solidifying weld puddle and subsequently cooling weld bead.

Embodiment Four—Composition of the New Weld Wire Alloy. As noted above, the new weld wire alloy composition which has been developed for the practice of the instant invention is used in both the cold wire buttering procedure for the buildup of the first four or five layers onto the first prepared rotor surfaces as well as for the hot wire procedure which is subsequently used to lay down and deposit the bulk of the weld wire buildup, be it over said prepared surfaces or within narrow grooves or used to fill gaps between opposing rotor end faces of two or more rotor segments.

The new composition comprising the instant invention weld wire alloy is based in part on the 9Cr alloy originally developed by the Department of Energy at the Oak Ridge National Laboratory, circa 1975, which alloy was at that time designed for high temperature creep strength as well as improved room temperature mechanical properties for use in the breeder reactor program ongoing at that time. This alloy as originally developed has been described by Sikka et al., "Production, Fabrication, Properties, and Applications of Ferritic Steels for High-Temperature Applications," 1981, as having the following composition:

C=0.08 to 0.12%
Mn=0.30 to 0.60%
P=0.020% maximum
S=0.0100% maximum
Si=0.20 to 0.50%
Cr=8.00 to 9.50%
Mo=0.85 to 1.05%
V=0.16 to 0.25%
Cb=0.06 to 0.10%
N=0.030 to 0.070%
Ni=0.40% maximum
Fe=Balance In the disclosure of Clark et al. in both '519 and '431, supra, the alloy composition disclosed for deposit onto their worn rotor surfaces for buildup could be construed to be a variation of the Oak Ridge alloy, supra, except for its considerable low chromium content. As will be seen from a later more detailed description of the alloy comprising Embodiment Three of the instant invention, the welding filler wire material of this invention may be considered a specific subset of the Oak Ridge modified 9Cr-1Mo, wherein: (1) compositional limits for additional elements are recited, (2) residual combination limits for materials such as arsenic and antimony as well as tin and lead are specified, and (3) a chromium equivalent factor is defined.

Embodiment Five—Fusion Line Placement. As should be appreciated by those skilled in the art, a weldment may be thought of to consist of several portions including the unaffected base metal, the HAZ of the base metal, the fusion line and the weldment filler metal. It should also be appreciated that the HAZ portion of the weldment is by far the most complex area thereof and usually has a coarse-grained portion immediately adjacent to the fusion line, a fine-grained portion adjacent to said coarse-grained portion, intercritically annealed portion, a tempered portion, and then the unaffected base metal. Further, it is realized that each of these regions of the HAZ are altered by the heating effect of the arc and the molten weld puddle inherent in the welding process. As will be discussed in greater detail, infra, there may be effected a soft zone in the grain refined and intercritically annealed regions of the HAZ which can lead to vulnerability of "type 4" cracking if the normal service operation of the welded component is in the high temperature creep range. This particular embodiment of the instant invention addresses a method to choose the location of the weld fusion line so as to avoid vulnerability to stress rupture failure in the soft zone of the HAZ at a premature time. Further, it is an object of this embodiment to choose or establish the optimum location of the fusion line to assure a design margin for future service life in the range of at least 200,000 hours for the zones of the weldment in the immediate proximity of the fusion line. As previously noted, there is a potential conflict between the amount of weld metal to be deposited in the practice of Embodiment One herein and the optimum location of the fusion line. For example, when the rotor configuration requires a weld restoration of the blade attachment region removal of only the damaged material might permit a repair using the smallest amount of weld metal which needs to be added back thereto prior to machining of steeples and the like. However, such a procedure will effectively place the fusion line high on the rotor disc in a location wherein incoming hot steam, or gases exacerbates the problem. On the other hand, by moving the fusion line further away from the worn surfaces and closer to the main body of the rotor so as to seek a lower operating temperature, there is exaggerated the problem of having to add that much more weld metal during buildup which is both costly in terms of time consumed and potentially costly in terms of the more metal that is added, the more the room for error from unwanted inclusions, etc., in the weld puddle. Accordingly, this Embodiment Five of the invention relies on a new short-cut applied to certain stress analysis procedures, including the finite element method (hereinafter FEM). Although there are numerous texts on the FEM method, there does not appear to be a singular teaching wherein the FEM stress analysis is compared with the representation of stress rupture data obtained from the rotor base material at a preferred confidence limit without the need for first obtaining stress rupture data from cross-weld samples tested to include not only the base material supra, but also the HAZ and the weld metal in the sample.

SUMMARY OF THE INVENTION

The instant invention is directed to new, improved, and novel welding means, methods, and procedures (Technique) as well as systems for repairing cracked or otherwise failed rotor shafts as well as for reconstituting worn or fatigued portions thereof. The Technique includes: (1) a new short-cut which greatly reduces the cost and time for performing an analysis for optimum weld fusion line placement, (2) reduced relative heat input of cold wire welding procedures for effecting a buttering layer which procedure limits the effective influence of and grain refinement in the critical base metal HAZ, (3) concurrent use and application of argon gas alone and a mixture of helium and argon gas for hot wire welding, (4) a specially designed shroud for protecting the weld puddle during hot wire welding effected subsequent to deposit of the "buttering" layer, and (5) a new alloy composition and microstructural variant of the modified 9Cr alloy originally developed by DOE.

The weld Technique for repairing rotor shafts substantially improves the high temperature properties of the weld metal which is deposited over the base metal alloys used by the original equipment manufacturer especially the prepared surfaces thereof. During the buttering operation the Technique also employs sequential bead placement to further reduce the relative heat input and to minimize the potential for weld defects which might otherwise be caused by the lack-of-fusion of the weld by placing the arc over the edge of the previous weld bead.

In the practice of either Embodiment One or Embodiment Two of the instant invention it will be appreciated that first a portion of either worn metal or cracked or otherwise failed metal is removed from the rotor periphery or rotor segments end faces, respectively. In the instance of repair of worn rotors for subsequent disc buildup the exact line or plane, be it flat or curved, to which the machining is carried, i.e., the "cut line," determines the location of the so-called fusion line during the subsequent first of the four layers of cold wire weldment. In the case of joining of cracked or otherwise failed rotor segments, the cracked segment is cut out and a determination of how much metal is removed is dictated less by the peripheral geometry of the rotor shaft or discs and wheels thereon. In any event, once it has been determined as to how much material to cut-away from the shaft periphery or end faces, the metal thereunder is subsequently subjected to the herein referenced buttering operation wherein normally four separate weldments are laid thereover one upon the other in a sequence wherein the weld is made in the case of worn shafts transverse to the rotor body and in the case of rotor segment ends essentially concentrically with the rotor axis. A first bead is laid down preferably on the freshly prepared surface at one edge thereof which in the case of a worn rotor disc will be either the edge thereof either furthest up or furthest down the length of the shaft or in the case of a repairing of rotor segments the situs generally at or very close to the center line of the rotor segment. Thereafter, the bead pattern is controlled such that as a bead is laid down next to a previously laid down bead, the cold wire gas tungsten arc is placed over the edge of the previous bead thereby ensuring that the bead next laid down is well fused to both the previous bead and the base metal thereunder, i.e., there is complete penetration both to the side and the bottom of the weld puddle. After the first layer of beads are laid down in the manner just described, the second layer is welded thereover using the same bead sequencing procedure until at least three or four and sometimes five or even six layers of weldment have been deposited onto the prepared surface of the rotor base metal. This buttering operation and Technique is unique and completely different from any procedures described in the prior art and in particular the procedures and system described by Clark et al., supra, wherein is taught the use of a higher heat input during the second weldment over the first so as to drive heat through the first weldment into the HAZ of the base metal. This is not the practice taught in the instant invention. Quite to the contrary, what has been now discovered and herein described in the Technique for effecting the buttering layer by cold wire arc welding is that the second weldment laid down upon the first is effected at a relative heat input less than that utilized for the first weldment. Equally important is the continuing of the operation so that each new and subsequent weldment of the first three, four or five layers is effected at a continued reduced relative heat input during the cold wire welding compared to the first layer; hence, the term herein utilized for describing the buttering operation of the instant invention as "reduced relative heat input." As will be described in greater detail later in the preferred embodiments of the instant invention, the metallurgical effect of this new and novel reduced relative heat input of cold wire welding for effecting the buttering layer leads to optimizing the metallurgical properties of the heat affected zone of the base metal and wherein the buttering layer comprises the interface between the base metal and the later deposited hot wire buildup metal.

It should be further appreciated that the relative heat used on say the third and fourth or even the fifth and sixth layers may be further sequenced in any number of permutations so that the heat input of layer three relative to layer two is greater than, equal to, or less than the differential of heat input of the second layer relative to the first layer so long as all of the relative heat inputs are relatively less than that used for deposit of the first layer. Such choice of permutations is further available for deposit of the fourth layer relative to the third layer and/or the second layer, and if used the fifth and sixth layers. The important parameter is that the relative heat input used to lay down the second, third, fourth, and if used the fifth and sixth layers are all less than that used to deposit the first layer regardless of whether or not they are respectively greater than, equal to, or less than one another.

In regards to the later hot wire buildup metal procedure, it should be understood that during practice of either Embodiment One or Embodiment Two of the instant invention, there is still a need to deposit over the buttering layer the substantial portion of the weld buildup, be it for (1) reconstructing the remainder of a disc or wheel profile of mass substantial enough for the later machining thereof, (2) filling of grooves in the rotor body produced by machining out an unwanted cracked area adjacent thereto, or (3) in the case of joining rotor segments together the gap or space between the rotor segment end faces. Since the cold wire welding Technique is necessarily used for buttering because it produces desirable and closely controlled weld metallurgy it, nevertheless, suffers from the deficiency that its relative deposition rate is quite limited, perhaps being only from about 10 to about 20 percent of the hot wire rate. Accordingly, after the buttering layer is produced, and if desired, machined, the substantial amount of weldment for the finished product is laid thereover in the practice of the instant invention by the application of hot wire arc welding which results in a relatively high deposition rate, thereby minimizing the time required for finishing the operation albeit, the use of such hot wire welding techniques in the prior art reportedly lead to unwanted and undesirable weld inclusions oftentimes attributable to the type of cover gas utilized over the hot weld puddle and the exposure of the weld puddle to the atmosphere either before it has completely solidified or crusted over or after it has so crusted but while it is still at a high enough temperature for rapid combination with atmospheric oxygen.

Accordingly, the practice of Embodiment Three of the instant invention is directed principally to the hot wire welding procedure wherein the usual cover gas for cold wire welding and comprised of argon is replaced in the vicinity of the arc, i.e., just under the tungsten electrode with a mixture of helium and argon wherein the volumetric ratio of helium:argon ranges between from about 0.33 to about 3, preferably ranges from between from about 0.33 to about 1, and most preferably ranges between about 0.33 to about 0.5. Furthermore, the resulting weld puddle is then contacted with argon gas as it is allowed to solidify and further cool.

Argon is used as an inert shielding gas for the cold wire gas tungsten arc welding process for a number of reasons. When shielding with argon gas, the welding arc has reduced penetration which melts less of the base metal composition. The base metal on the older rotor materials is high in residual elements than can lead to weld defects. The lower penetration potential of argon assures a high quality weld in the first few critical layers. Argon is a monatomic gas having an atomic weight of forty. Argon is denser than air which means that relatively low flow rates are needed for proper shielding and increased resistance to cross-drafts during welding. Also, argon is relatively inexpensive, results in a quieter arc, and renders arc starting easier.

Helium is also used as an inert shielding gas. Helium is also a monatomic gas having an atomic weight of four which makes helium lighter than air. For constant values of welding current and arc length, helium transfer more heat into the work piece than argon. The greater heating power of the helium arc can be advantageous for joining metals of high conductivity and for high-speed automated processes such as hot wire gas tungsten arc welding. Helium produces a deeper penetration of the base metal than argon for equivalent welding parameters.

A mixture of argon and helium is used to achieve a balance of the characteristics of both gases. The chief factor influencing shielding effectiveness is the gas density. Argon is approximately one and one-third times as heavy as air and ten times as heavy as helium. Argon, after leaving the torch nozzle, forms a blanket over the weld area. Helium, because it is lighter, tends to rise around the torch nozzle.

Two important characteristics in the use of these gases are the voltage-current relationships of the tungsten arc in argon and helium and the aspect ratio of the weld nugget (bead width to penetration depth). At all current levels, for the equivalent arc lengths, the arc voltage obtained with helium is about eighty percent higher than that with argon. This means that helium will produce higher quality welds at higher speeds and deposition rates. Both gases provide excellent arc stability during the hot wire gas tungsten arc welding process. Control of the aspect ratio is critical to avoid solidification cracking and to achieve a proper external contour to facilitate bead-to-bead tie-in. Proper blending of the helium and argon is one important means to control the weld nugget aspect ratio.

The instant new shroud provides the mechanical means to assure proper positioning of the helium and argon gases during the high deposition rate of the hot wire gas tungsten arc welding process. Helium and argon are, in the most preferred embodiment, mixed in the tungsten torch nozzle to affect the characteristics of the weld nugget. Argon is most preferably introduced into the hot wire feed nozzle to prevent the oxidation of the wire as it is fed into the weld puddle. Argon is also used in the stainless steel mesh distribution device used to supply shielding gas to the shroud.

The shroud is constructed of high temperature fiberglass tape to fit the contour of the weldment. The length of the shroud is of a length sufficient to provide shielding gas cover over the weldment until the metal temperature decreases to approximately 800° F. Since such cooling requires about 60 seconds in rotors of greater than about 15 inches in diameter, at the recommended travel speed (Table 2 or 3, infra), this translates to a length of about 12 inches. Accordingly, the length of the shroud usually need not be customized for a particular welding operation, since larger rotors are turned at a slower rate. For example, in the case of hot wire weldments being deposited on the periphery of a rotor wheel of 20 inches in diameter, the rotor is caused to turn under the torch at about 0.2 RPM, in order to produce the travel speed recommended in Table 2 (12–13 inches/minute) or the preferred travel speed of about 12.5 inches/minute (Table 3). In another instance wherein the rotor wheel is 26 inches in diameter, it is turned at about 0.15 RPMs. The above relationships are determined when the average distance from the work surface to the distribution device of the shroud is from about 0.75 to about 1.5 inches. This allows for controlled solidification and avoidance of oxidation of the weld metal as it cools. Solidification cracking is possible without proper cooling rates for the high welding speed and deposition rates used in this invention. Oxidation of the weld metal as it cools would also lead to imperfections in the final completed product since oxides would accumulate on successive passes. The width of the shroud is also critical for proper gas shielding. The width of the shroud should be approximately four to five times the width of the weld puddle utilized. Using the preferred parameters of the instant invention, with a weld puddle width of about 0.75 inches the width of the shroud should be at least about 3 inches and may vary up to about 6 inches.

During the experimental phase, gas mixtures of argon and helium were tried ranging from 25 to 75 percent of each gas.

Helium contents of 25 to 35 percent were found to have the best combination of characteristics that produced the optimum penetration, best weld nugget contour, no solidification cracks, and the best quality weldment. General limits for the hot wire process on a volumetric ratio of helium:argon can range from about 0.33 to about 3, and preferably ranges from about 0.33 to about 1, and still most preferably ranges from about 0.33 to about 0.5.

Practice of Embodiment Four of the instant invention is directed to the new and improved weld alloy composition which is employed in the practice of the instant invention both as the feed cold wire and the feed hot wire. As noted above, the instant new wire-weld alloy is based on the alloy developed at Oak Ridge supra, and like same is relatively high in chromium content rather than being specified to have the relatively low chromium content taught by Clark et al., supra. In addition to the instant new alloy composition specifying the elements originally contained in the Oak Ridge composition it further restricts the compositional limits of several of those elements and in addition further specifies the compositional limits for a substantial number of other elements, together with specifying the so-called chromium equivalent found to be necessary for the proper practice of the instant invention.

Practice of the Embodiment Five is related most directly to the utilization of Embodiment One, supra, wherein it first must be determined just how much of a worn surface of a rotor disc or wheel including, for instance, steeples at the periphery thereof into and with which turbine blades are secured, must be removed for ensuring that the resulting prepared surface, which acts as the situs for the subsequently formed fusion line is not left in a position such that the deleterious effects of hot gases and/or hot steam impinging thereon causes creep rupture. Accordingly, in its simplest form this embodiment relates to the selection or establishment of the location of the fusion line to ensure a service life of at least 200,000 hours for the zones of the weldment in the immediate proximity of the fusion line. This embodiment relates to a new and highly reliable short-cut method for determining the proper criteria for choosing or establishing the location of the fusion line situs and is based on the FEM of stress analysis and the mechanical properties of the rotor base material, including guarding against premature failure in the region of the fusion line from stress rupture (creep).

The creep range of metals generally begins at about one-third of the absolute melting temperature and extends to the melting temperature. When subjected to sufficient stress in this temperature range, metals deform (creep) under constant stress until they develop cracks and eventually fracture (stress rupture). Many years ago, it was found that there were general correlations between stress, temperature, and time-to-rupture data. The most general correlations involved a well-behaved monotonic relationship between the logarithm of stress and a "time-temperature" parameter. Since the initial discovery of the concept, more than twenty-five time-temperature parameters have been developed for a variety of metals. One of the correlations which works well for rotor steels is the Larson-Miller time-temperature parameter.

When the logarithm of stress is used as the abscissa and the Larson-Miller parameter is used as the ordinate, a collection of stress-rupture data from many different heats of the same material can be represented. From a statistical standpoint, such stress rupture data can be bounded by a "minimum" and a "maximum" curve and has average behavior represented by the mean line. If the minimum and maximum curves represent the upper and lower of 95 percent confidence limits; then 90 percent of the observations will be bounded between the minimum and the maximum. As explained infra, for purposes of the present invention, the minimum curve, as depicted, for example, in FIGS. 12 and 13, and discussed in greater detail infra, is the only one of relevance.

Accordingly, for identification of a preferred or optimum location of the weld fusion line for a weld repair to assure at least 200,000 hours of future service life, three pieces of data have heretofore been required to examine whether a particular location satisfies the future service life criteria:

1. A FEM stress analysis of the rotor at steady-state temperature and normal operating speed. Usually the life criteria can be satisfied with a linear elastic FEM solution. For example, if review of the stress analysis reveals that any of the three principal stresses, i.e., radial, axial, or tangential or the special relationship therebetween, as set out in the von Mises equivalent stress, are less than the base metal but exceed the weldment design criteria, the placement of the fusion line leading to such results must be revisited and a new situs therefore selected closer to the axis of the rotor whereupon a new FEM model is constructed, loaded, and reviewed until none of the principal stresses, or the von Mises equivalent stress, exceed such design criteria.

2. Graphical and/or numerical representation of the stress rupture data for the rotor base material with sufficient data to establish the statistical minimum curve, supra, resulting from a plot of the log of stress vs. the Larson-Miller parameter (95 percent confidence band).

3. Stress-rupture data for so-called crossweld samples tested to include the base metal, HAZ, and weld metal in the sample. If these data lie above the minimum line, the design proceeds based on base metal minimum properties. If on the other hand, these data fall below the minimum of the base metal, a new "weldment minimum" line is drawn at or below the lowest weldment data and this becomes the new minimum for design purposes.

The new short-cut Technique of this Embodiment Five of the instant invention allows the analyst to proceed with only the data obtained in 1 or 2, supra, i.e., there no longer is a need to spend considerable money, time, and effort in gathering stress-rupture data from such crossweld samples when the cold wire and the hot wire technique of the instant invention is practiced using the instant new shroud, the instant new cover gases, and the instant new weld wire alloy.

OBJECTS OF THE INVENTION

It is therefore the principal object of the present invention to develop a new system, method, and means for effectively repairing worn, cracked, or otherwise failed rotors, wherein the useful service life of the repaired or refurbished rotor when operated at its original design temperature is at least 200,000 hours.

A further object of the present invention is to develop a new system, method, and means for effectively refurbishing rotors having worn or otherwise failed discs or wheels whereby a selected portion of said discs or wheel usually including the steeple region and a portion of the disc therebeneath is removed by machining, and whereupon the resulting prepared surface, is deposited new weld metal of a size and configuration sufficient so that it may later be machined to the same or similar configuration as the original wheel or disc was supplied by the manufacturer and further wherein such refurbished or repaired worn surface exhibits a useful life when put back into service at operating temperature of at least 200,000 hours.

Another object of the present invention is to develop a new system, method, and means for efficiently and effectively replacing cracked sections of rotors whereby the crack and metal juxtaposed thereto is machined or otherwise removed and new weld metal and/or a new section of rotor is added thereto to result in a refurbished shaft having a statistically predictable useful life under design operating conditions of at least about 200,000 hours.

Still a further object of the present invention is to develop a new system, method, and means whereby the interface formed between the prepared surface after the machining away operation and the substantial portion of hot wire weldment added thereto minimizes the normal deleterious effects that prior welding methods have had thereon as well as the material just below said interface comprising the HAZ of the rotor base metal.

A still further object of the present invention is to develop a new system, method, and means for more easily and concisely determining the proper placement of the cut line, which is essentially the fusion line by first removing a portion of the worn or failed wheel or disc whereby the resulting fusion line placement is optimized so as to minimize the amount of weldment required to be added back to the outer areas of the wheel or disc and to minimize the deleterious effects of creep rupture stress acting thereon and effected by the impingement in that general area of incoming hot fluids which are introduced for purposes of acting on the blades supported by such wheels or discs.

Still another object of the present invention is to develop a new system, method, and means for ensuring the proper profile and strength characteristics of the weld puddle normally associated with hot wire gas tungsten arc welding utilized to effect the deposition of the substantial portion of weldment subsequently laid down on the buttering layer deposited on prepared surfaces of worn rotors or in gaps or apertures interdisposed end faces of rotor segments.

An additional object of the present invention is to develop a new method, process and Technique for performing the buttering operation for establishing said interface on the rotor prepared surface and the new weldments added thereto by said gas tungsten hot wire procedure.

An additional object of the present invention is to develop a new system, method, and means for effectively establishing said interface region comprising said buttering layer by utilizing gas tungsten arc cold wire welding in a manner such that there is substantially no tempering of the HAZ therebeneath resulting from, or attributable to any so-called, in the prior art, "increased" heat input of the second, third, and fourth layers of weldment; and, of course, if deposited, the fifth and further if deposited, the sixth layers comprising said buttering.

Still an additional object of the present invention is to develop a new system, method, and means for effecting said buttering layer either on the prepared peripheral, or the end surfaces of rotors through the utilization of gas tungsten arc cold wire welding and comprising from about four to about six weld beads deposited, one over the other, with the first such weldment effected on such prepared rotor surface and wherein the subsequent three to five weld beads are effected thereafter with reduced relative heat input.

Still an additional object of the present invention is to develop a new composition of matter for use as the weld wire alloy in both the cold wire operations for effecting said buttering layer and in the subsequent hot wire operations for deposit of the substantial portion of weldment added by the present invention wherein said new composition of matter is fully compatible with ASTM A-470 alloys of class 3, 7, and 8, which new alloy yields a resultant metallurgy in both the buttering layer and the substantial weldments thereover which is, in addition to being compatible with the rotor base metal, characterized as being substantially superior in both room and high temperature strength, fatigue, fracture, and creep resistant properties.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing substantially from the true spirit and scope of the present invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Referring now more specifically to FIGS. 1–4, therein are illustrated certain stages of the practice of Embodiment One of the instant invention as they relate to repairing worn rotor surfaces including correct placement of the cut line which essentially becomes the fusion line and the subsequent cold wire weldment immediately thereover effected by practice of the instant, new, and novel "reduced relative heat input" followed by tungsten gas hot wire welding for buildup of sufficient material whereby later machining thereof reconstitutes the worn surface back to the original profile or silhouette obtained from the original manufacture is illustrated.

Figure 1:
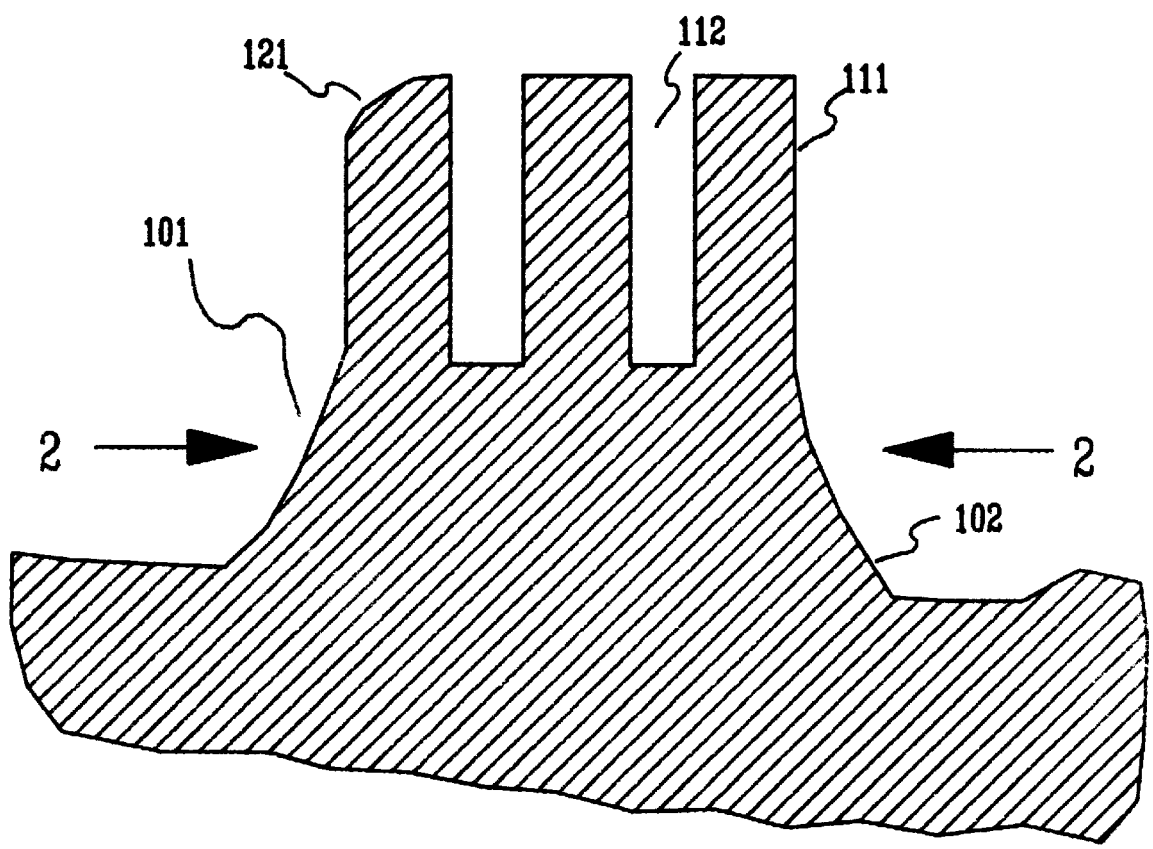
FIG. 1 is a partial, sectional view of a control stage rotor with the worn steeple shown thereon, said section being in a plane through the center line of the rotor.

Referring now more specifically to FIG. 1, therein is illustrated a partial cross-sectional view of rotor stage 101 wherein a worn portion of steeple 111 is illustrated at 121. Accommodations in steeple 111 for turbine blades are indicated by slot 112. The wheel portion of rotor 101 begins in the general vicinity indicated at 102. As indicated supra in the repair of such worn steeples 111, all of the metal comprising the steeple and a portion of the wheel 102 on rotor body 101 is generally machined away. The critical determination of the "cut line" indicated at 2—2 is the subject of another embodiment of the instant invention but, nevertheless, is critical in that it may be easily appreciated that the lower the location of cut line 2—2, the more of the material which will have to be added back thereto by buildup of weldments so that subsequent machining thereof can reconstitute a new steeple 111.

Figure 2:
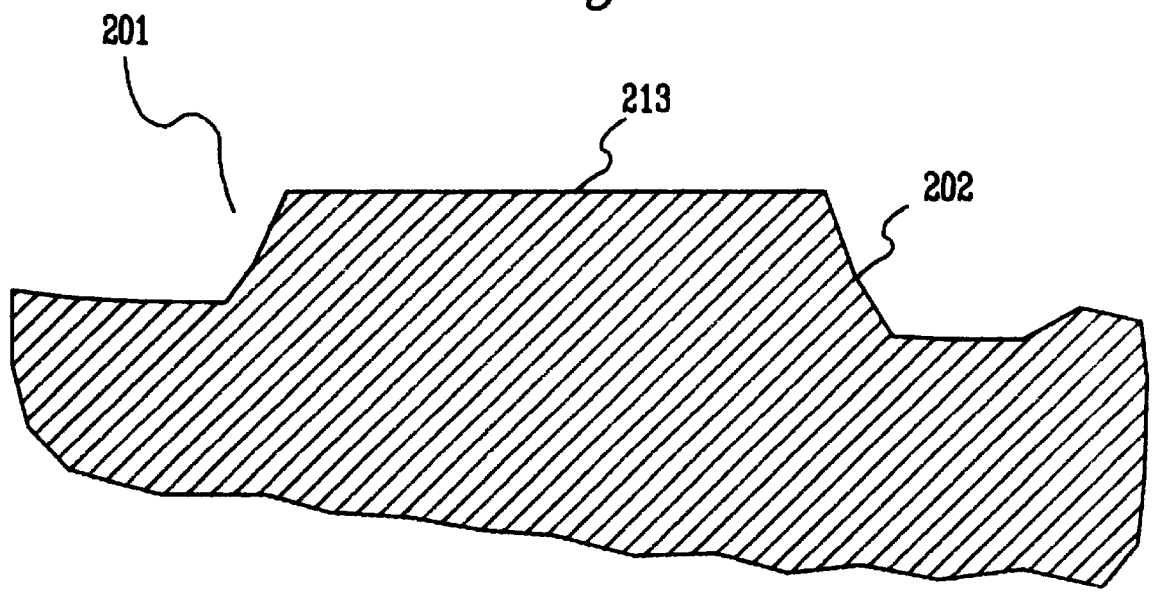
FIG. 2 is the partial cross-sectional view of the control stage rotor of FIG. 1 illustrating the removal of the steeple and a portion of the wheel which supported same.

Referring now more specifically to FIG. 2, therein is shown the partial cross-sectional rotor body of FIG. 1 generally at 201 with the steeple and a portion of the wheel section 202 machined away leaving exposed a prepared surface 213 at cut line 203. To those skilled in the art it will be appreciated that cut line 203 will establish the situs of the later formed fusion line (not shown) whereupon weld metal deposits will be made.

In preparation for the preferred gas tungsten arc cold wire welding procedure, for effecting the buttering layer embodiment of the instant invention, surface 213 is preferably conditioned to a bright metal if the cut was made for more than a couple of days prior to depositing weld metal thereon. In such instances, wherein the cut had been made at least several days prior to the first weld deposit, base metal surface 213 at cut line 203 is generally cleaned with material such as alcohol, acetone, chloroform or other solvent cleaners. It is also customary in such instances that base metal surface 213 effected by cut line 203 be inspected using nondestructive testing procedures for ascertaining that sufficient material has been removed beyond the deepest crack or fatigue area originally detected high on wheel 202.

Figure 3:
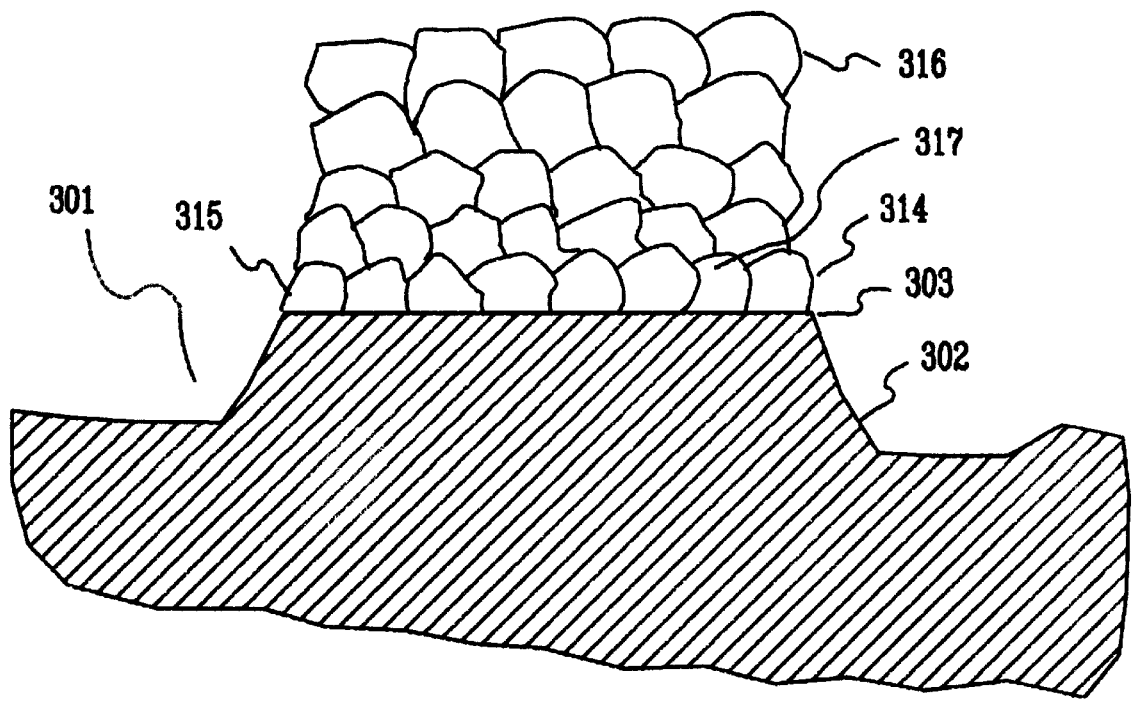
FIG. 3 is the partial, cross-sectional view of the control stage rotor of FIG. 2 illustrating a weld buildup disposed on the machined, or prepared rotor surface.

Referring now more specifically to FIG. 3, there is shown the cut-away partial, cross-sectional view of rotor 201 of FIG. 2 herein generally illustrated at 301 with the fusion line indicated at 303.

As previously stated, the procedure for repairing of worn surfaces includes depositing on prepared surface 213, established by cut line 203 of FIG. 2, a first layer of molten weld metal for establishment of fusion line herein at 303 in a bead sequencing mode wherein for instance, the first bead laid thereover may be represented at 314 and the last bead in that layer of weldment represented at 315. It is respectfully noted that the rendition of the beads comprising the various layers as well as the number of layers, which herein for convenience, are usually described as four layers of weldment are not to be construed as limiting or restrictive as to the relative size thereof nor to the number of layers of weldment laid over the prepared surface of wheel 302, since for the purposes of clear illustration and in consideration of reduction in size of the drawings during printing of this patent, the particular bead sizes are exaggerated for the convenience of the reader. Accordingly, in the weldment procedure the first layer of weldment laid over the prepared surface juxtaposed fusion line 303 is performed by the cold wire arc welding technique as is the next three or four layers further deposited thereover. Most important, the relative heat input utilized for the first layer of weldment at, for instance, 314–315 is greater than the relative heat input of the second layer of weldment which second layer of weldment is laid down at a relative heat input which may be greater than, equal to, or less than the third layer of cold wire weldment and greater than, equal to, or less than the relative heat input used to lay down the fourth layer of weldment, which fourth layer of weldment if followed by one or more cold wire deposits, may be greater than, equal to, or less than such subsequent cold wire deposits so long as said relative heat inputs used to deposit the second, third, fourth, and if deposited, subsequent buttering layers, are all less than the relative heat input used to lay down the first layer. To put it another way, after the fusion line is established by laying down the first layer of beads 314–315, the layers of cold wire weld thereover are each laid down at a relative heat input less than the relative input used to effect the first layer. In one alternative, the second, third, fourth, fifth, and perhaps sixth such layers may be deposited at about equal relative heat inputs, one to the other, but still less than the relative heat input used to effect the first layer of weldment. In another alternative, such relative heat inputs are sequentially reduced, one relative to another. In still another alternative, the second layer is laid down using a heat input less than, not only layer one, but also layers three and four, it being noted, of course, that the heat used to deposit said third and fourth layers, although greater than that used to deposit said second layer, are less than that used to deposit said first layer. After the resulting, equal or, if preferred, the resulting staged reduction of relative heat input in the cold wire welding operation or as also herein termed as "reduced relative heat input," the subsequently deposited layers of material deposited onto wheel 302 for buildup of a resulting silhouette or profile sufficient such that subsequent machining thereof can yield the desired size and shape of reconstituted steeples are effected by hot wire welding wherein substantially large amounts of metal are deposited at rates considerably greater than that which can be laid down by the cold wire weldments therebelow until the last layer of beads as represented at 316 are effected. That is to say, that after the cold wire buttering operation is completed with the lay down or deposit of the first three to say six layers, or, if desired more layers, the remaining weldments utilized to deposit material for buildup of the wheel or spindle, is effected with hot wire welding.

For those who are familiar with certain prior art weldment procedures, it will be appreciated that the procedures just herein described as they relate to the cold wire deposits are exactly opposite to what at least some prior art researchers have previously thought to be required vis-à-vis using a higher heat input as subsequent cold wire weldments are effected. It is, of course, understood that such bead lay down is effected by the relative movement of turning rotor 301 relative to a stationary tungsten arc torch whereby each bead extends essentially 360 degrees around the periphery (transversely) of the rotor surface. In continuing the welding procedure, the center line of the tungsten electrode is positioned over the left shoulder of finished bead 314 whereupon as new bead 317 is deposited, there is assurance that in addition to penetration the prepared surface juxtaposed fusion line 303 of wheel 302, there will also be the desired partial penetration into the juxtaposed shoulder portion of bead 314. It has been found in the development of the techniques comprising the instant invention that such placement of the subsequent beads and more important the placement of the torch thereover allows for a welding operation which does not require the use of run-off tabs along the longitudinal edge of rotor wheel 302 as is oftentimes required and disclosed in many prior art welding teachings.

As is referred to throughout this description of the instant invention the deposit of the first three to six to eight or more, but preferably four layers of weld beads by the cold wire method juxtaposed fusion line 303 effects what is herein referred to and defined as the buttering layer or simply buttering. Said buttering comprises an interface between the original unmachined portion or prepared surface of rotor wheel 302 and the subsequent layers of weldment laid down by the hot wire procedure.

Figure 4:
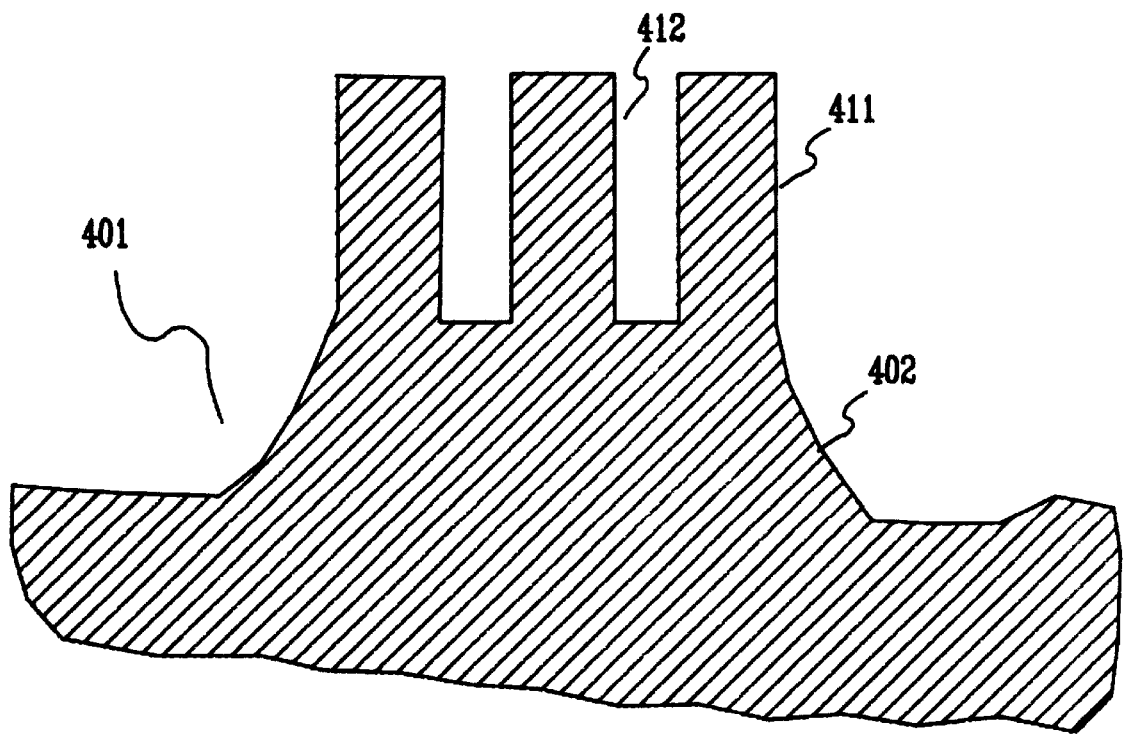
FIG. 4 is the partial, cross-sectional view of the control stage rotor of FIG. 3 illustrating a machined and repaired steeple.

Referring now more specifically to FIG. 4, therein is shown a partial cross-sectional view of the resulting reconstituted rotor wheel generally at 401, wherein wheel 402 has been rebuilt and subsequently machined to effect a new steeple such as shown at 411 having new slots or the like for subsequent blade attachment thereto as shown at 412.

Referring now to FIGS. 5–9, therein is illustrated Embodiment Two of the instant invention for forming a turbine rotor from rotor segments wherein segments thereof may comprise similar or different ferrous alloys.

Figure 5:
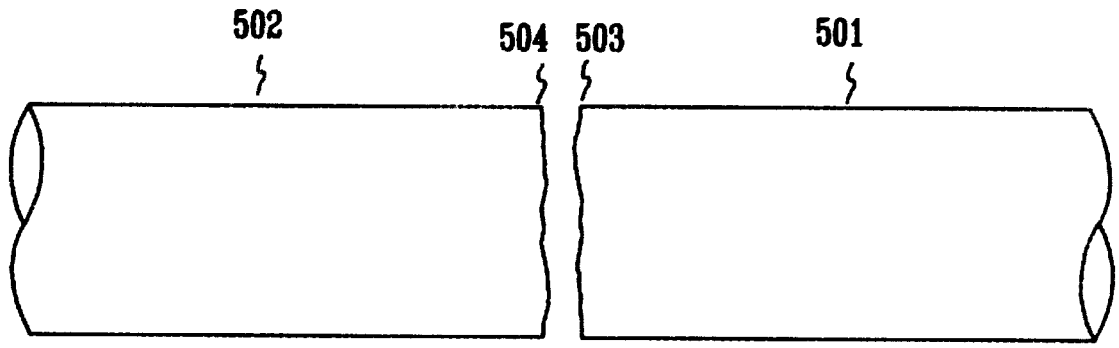
FIG. 5 is a partial, side-elevational view of two rotor segments which have fractured and are candidates for welding according to the present invention.

Referring now more specifically to FIG. 5, two rotor segments, first segment 501 and second segment 502 are shown subsequent to failure which is illustrated by broken surfaces 503 and 503a, respectively, extending radially outward from the longitudinal axial center line (not shown) of rotor segments 501 and 502.

Figure 6:
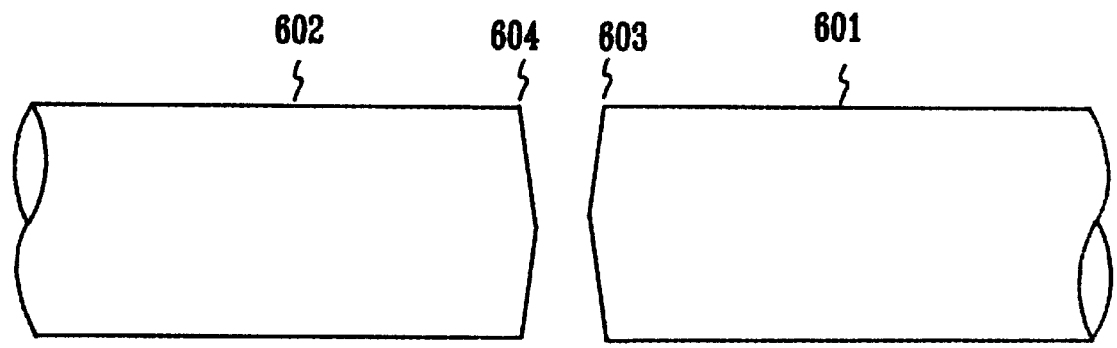
FIG. 6 is the partial, side-elevational view of the rotor segments of FIG. 5 illustrating machining on the axially extending surface, or end face of each rotor segment.

Referring now more specifically to FIG. 6, the same two rotor segments as shown in FIG. 5 are again illustrated subsequent to the desired machining of the broken surfaces now represented as machined surfaces 603 and 603a, respectively, again extending radially outward from the longitudinal axial center line (not shown) of rotor segments 601 and 602, respectively. Said surfaces or face ends 603 and 603a are each somewhat the equivalents of cut line 213 of FIG. 2.

Figure 7:
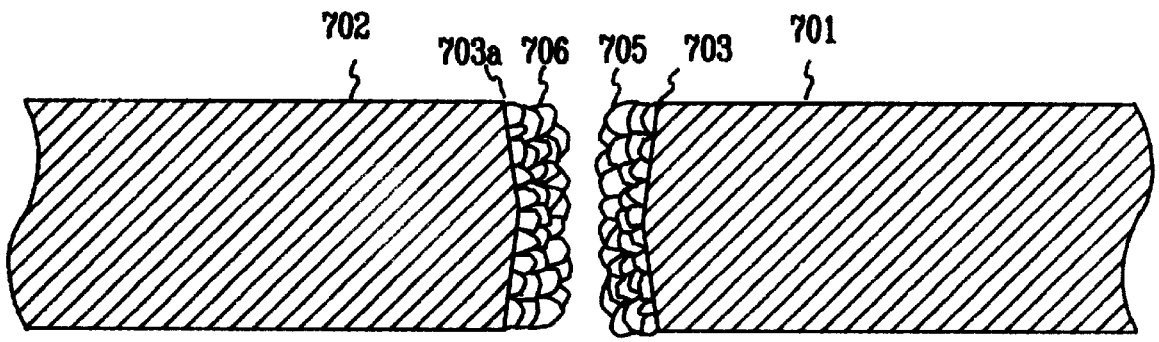
FIG. 7 is a partial, cross-sectional view of the rotor segments of FIG. 6 illustrating formation of the buttering layer on each of the axially extending surfaces of each rotor segment of FIG. 6.

Referring now more specifically to FIG. 7, there are illustrated the two rotor segments of FIG. 6 herein shown at 701 and 702 with the machined surfaces illustrated at 703 and 703a, respectively, together with a substantial amount of weld metal added thereto generally illustrated at 705 and 706, respectively. These substantial portions of weld metal added above machined or cut line 703 and 703a are effected as in Embodiment One of the instant invention wherein the buttering layer is first laid down thereon by means of depositing preferably four layers of metal by the cold wire method and further wherein the relative heat input for each of the successive stages or layers of weldment deposited subsequent to deposit of the first layer are made with a relative heat input thereto less than the relative heat input used to deposit each of the previous weld layers, it being understood, that in some instances although the relative heat input of the second layer must be less than that used to deposit the first, and the relative heat input used to deposit the third layer is less than that used to deposit the second layer, it is oftentimes desirable that the relative heat input of the fourth (and if used, fifth and/or sixth layers) may be again staged in sequentially reduced mode or at relative heat inputs whereby the fourth and subsequent, if any, cold wire layers are effected at about equal relative heat inputs, one to the other.

Figure 8:
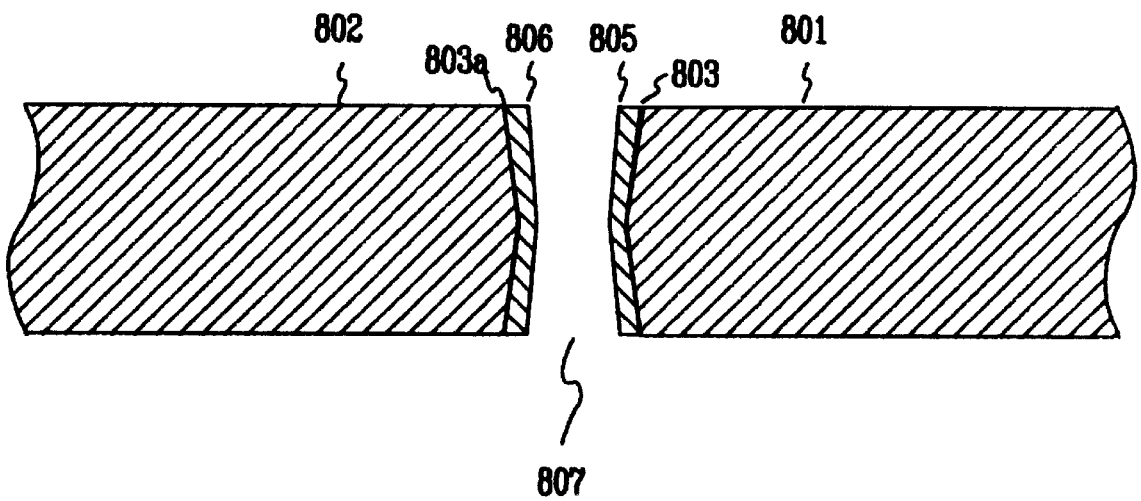
FIG. 8 is a partial, cross-sectional view similar to FIG. 7, but after machining of the buttering layers, said rotor segments are in spaced adjacent relation in preparation for a juncture weld.

Referring now more specifically to FIG. 8, therein is shown the same two rotor segments illustrated in FIG. 7, herein shown at 801 and 802, wherein the original prepared surface juxtaposed the cut line, now substantially the fusion lines are generally shown at 803 and 803a, respectively, after machining of the plethora of weld layers shown in FIG. 7 at 705 and 706, thereby yielding a profile conveniently illustrated at 805 and 806 with root gap 807 therebetween.

Figure 9:
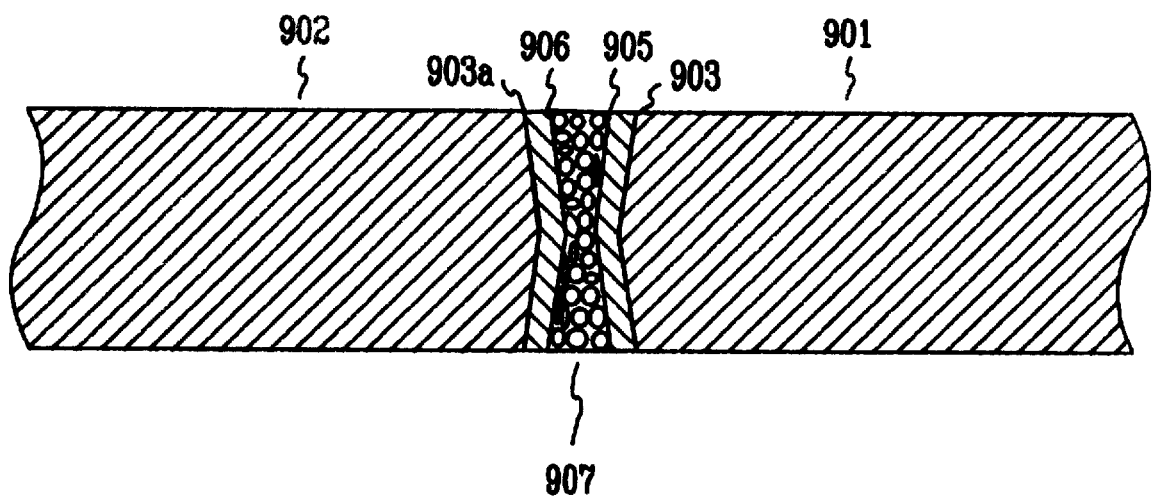
FIG. 9 is a partial, cross-sectional view of the rotor segments of FIG. 8 after formation of the juncture weld to form the rotor.

Referring now more specifically to FIG. 9, the rotor segments shown in FIG. 8 and herein illustrated at 901 and 902 are subsequently welded together across the welding root opening generally illustrated at 907 between machined surfaces 905 and 906 of rotors 901 and 902, respectively. From the above descriptions, it will be understood that welding across root opening 807 of FIG. 8 was made initially in the proximity of the centerline by the gas tungsten arc cold wire procedure and the balance by the gas tungsten arc hot wire procedure since the necessary interface or buttering required thereunder was laid down as in the description of FIG. 7, supra, and further that in some instances only the buttering layer need be laid over each axially extending fusion line prior to machining the surfaces generally illustrated at 905 and 906, unless, of course, the original fracture between rotor segments 501 and 502 in FIG. 5, supra, requires, during the machining thereof, removal of large amounts of original rotor material so that considerable additional metal needs to be added to each buttering layer before the execution of the root weld generally shown at 907.

Figure 10:
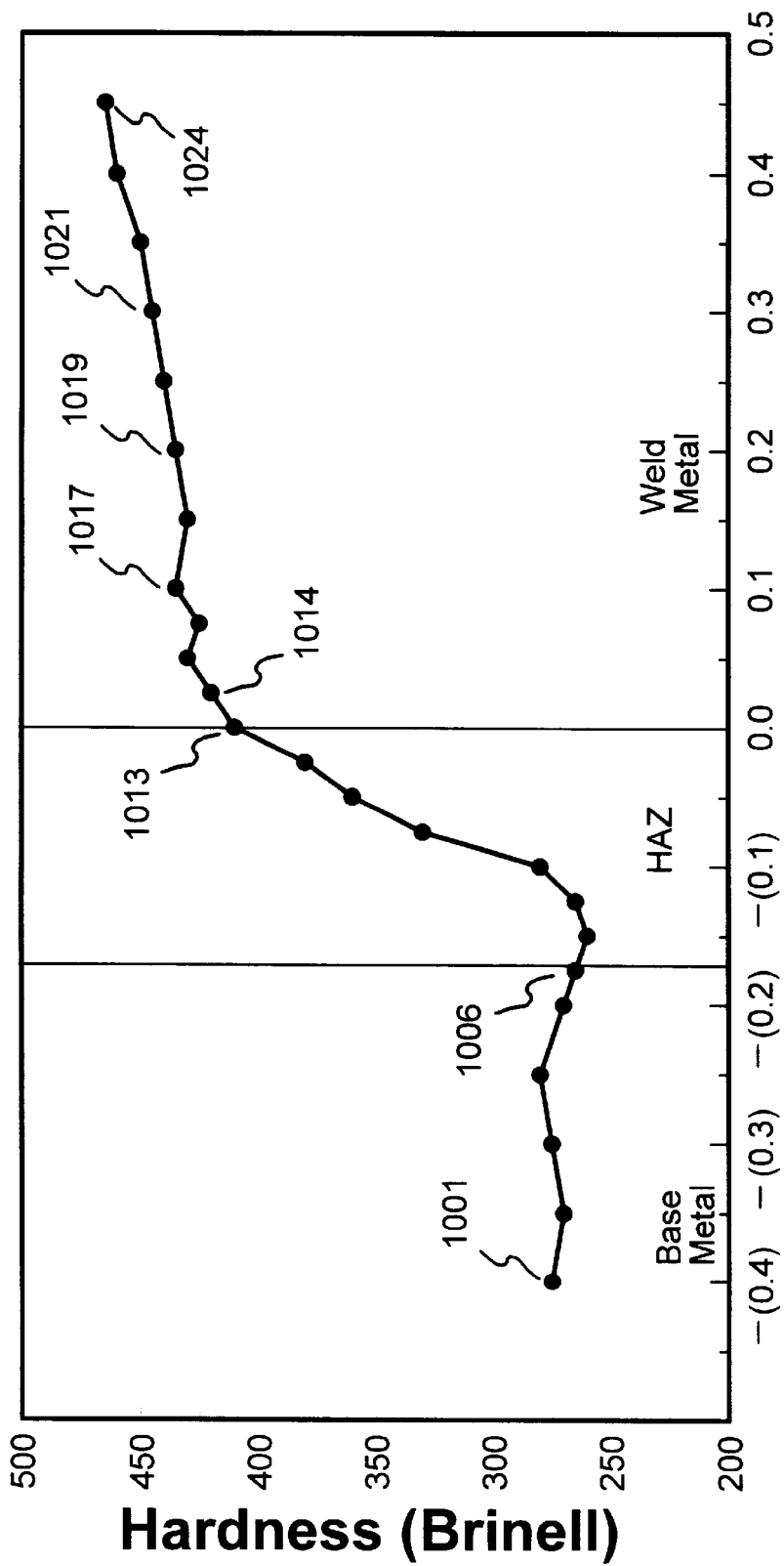
FIG. 10 is a graphical illustration of the hardness profile of the as-welded condition of a portion of a reconstituted rotor worn surface including a portion of the base metal, the HAZ, and a portion of the weld metal buildup thereover, said weldment comprised of both the cold and hot wire weld layers.

Referring now more specifically to FIG. 10, therein is graphically illustrated a hardness profile of data plotted of weldments made according to the practice of Embodiment One of the instant invention with the hardness profile starting well within the rotor base metal as represented by data point 1001 and continuing through the base metal to the start of the HAZ generally beginning at about data point 1006 and continuing in the HAZ through data point 1013 and thence into the weld metal added over the fusion line by both the buttering operation with the cold wire welding technique generally illustrated at about or to the left of data point 1014 and thence through the subsequently added weld metal deposited thereover by the hot wire method generally illustrated by data point 1017 through 1024. It is noted that these hardness profile data were collected prior to the subsequent post weld soaking heat treatment generally utilized for the repair of such rotors. From FIG. 10, it will be discerned that the base metal, generally represented between 1001 and 1006, exhibits the lowest hardness values, that importantly the transition between this relatively low hardness material and the relatively high hardness material effected by both the buttering and hot wire technique is, indeed, a smooth transition representing the effectiveness established in the HAZ by the instant practice of using stepped-down or reduced sequential relative heat inputs in the material first deposited thereover by the cold wire technique vis-à-vis the buttering layer.

Figure 11:
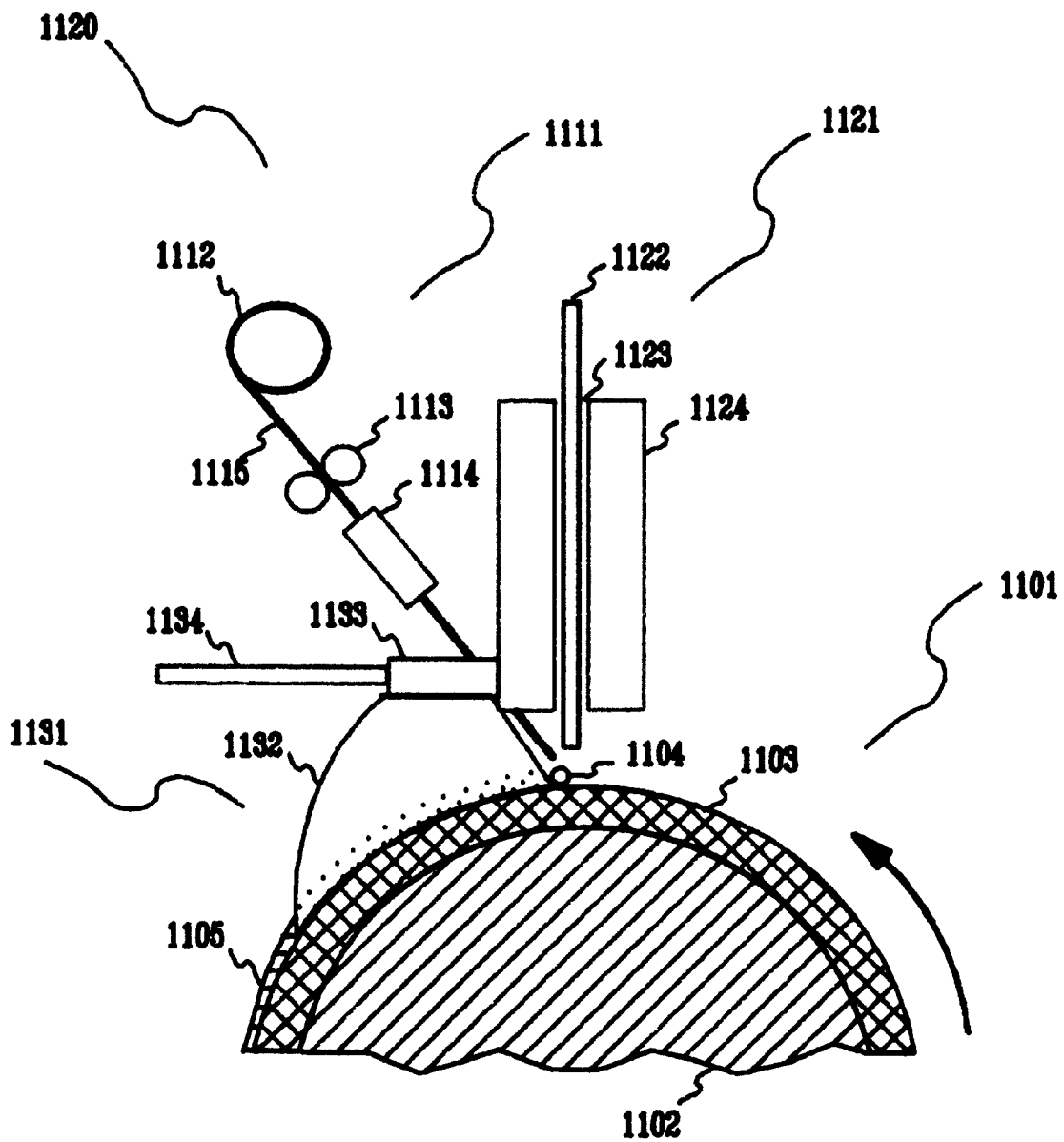
FIG. 11 is a schematic illustration showing the gas tungsten arc hot wire system of the type utilized in the practice of instant invention together with placement of the new and novel gas shroud utilized therewith.

Referring now more specifically to FIG. 11, therein is shown a schematic of the instant new gas tungsten arc hot wire welding system in conjunction with a partial cross-sectional view of a typical rotor in end-on fashion. As illustrated, the end-on or partial, cross-sectional view of rotor 1101 comprises main body or shaft 1102 with the peripheral surface of a wheel being repaired generally illustrated at 1103. Shown deposited on wheel 1103 is a bead of material generally illustrated at 1104 with the resulting slightly increased diameter of wheel 1103 illustrated at 1105. The gas tungsten arc hot wire welding system is generally illustrated at 1120 and is generally comprised of three major components. The first major component of gas tungsten arc hot wire welding system 1120 is the hot wire feed mechanism generally illustrated at 1111 comprised of hot wire supply 1112, roll feed means 1113, ohmic heating means 1114, and wire 1115. The second major component of gas tungsten arc hot wire welding system 1120 is torch means 1121 comprised of tungsten electrode holder 1124 with electrode 1122 shown therein and annular orifice means surrounding electrode 1122 generally illustrated at 1123 disposed for the introduction (not shown) of the helium/argon material herein used for cover gas. The third major component comprises new specialized gas shroud means generally shown at 1131 with the cover thereof 1132 preferably comprised of high temperature fiberglass material with its attendant gas diffusion means 1133 generally disposed thereover which gas diffusion means 1133 is adapted for input through aperture means 1134 of usually argon gas (not shown), for flooding or covering of the freshly effected weld puddle. Shroud 1132 has three sides and is open-ended in the vicinity of the weld head so that the equipment operator can look into and under shroud 1132 so as to be able to watch and control the welding process. Diffuser means 1133, although not herein shown to be, is usually curved to approximate the peripheral surface of wheel 1103.

Figure 12:
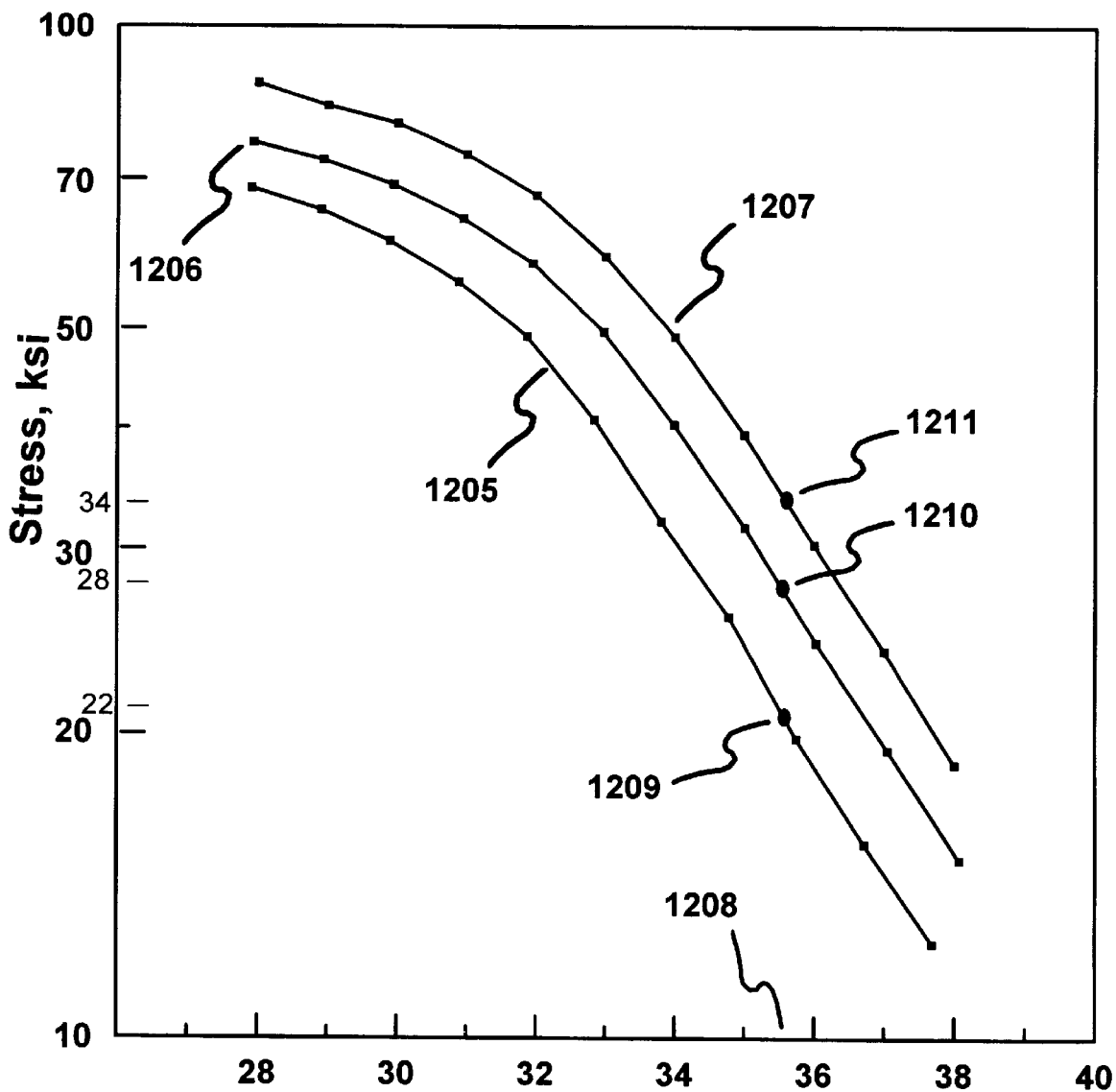
FIG. 12 is a graphical illustration of Larson-Miller stress rupture correlation of data from many heats of a particular Cr—Mo—V rotor steel.

Referring now more specifically to FIG. 12, the graphical illustration thereof represents Larson-Miller stress-rupture curves for a particular Cr—Mo—V rotor steel of the type usually requiring repair by practice of the instant invention. As may be appreciated, regression analysis may be performed on a collection of stress-rupture heat from many heats to produce a correlation of the type herein illustrated, wherein the abscissa for the so-called Larson-Miller parameter herein shown in English units, and wherein the ordinate to the base 10 logarithm of stress is also shown in English units. The regression lines which represent the minimum, the mean, and the maximum are generally shown at 1205, 1206, and 1207, respectively. The juncture of the abscissa at 1208 represents the particular Larson-Miller parameter at an operating temperature of 950° F. and for a time of 200,000 hours ($P_{LM}$=35,674). The intersection of the vertical extension from 1208 with the minimum, the mean, and the maximum curves 1205, 1206 and 1207, respectively, identifies the associated stress-rupture strengths for minimum, mean, and maximum values of this particular alloy with such intersections identified as 1209, 1210, and 1211, respectively, wherein the minimum strength established by the horizontal intersection of 1209 with the ordinate translates to 22 ksi, the mean strength from the horizontal extension of 1210 translates to 28 ksi and the maximum strength from the horizontal extension at 1211 translates to 34 ksi. The significance of this example illustrates that the maximum of either the von Mises equivalent stress or the maximum of any of the three principal stress, i.e., axial, tangential, or radial in the proximity of or juxtaposed the fusion line, would necessarily have to be a value less than the minimum strength represented by the horizontal extension from intersection 1209, i.e., 22 ksi, in order to achieve a life in the reconstituted rotor section of 200,000 hours at an operating temperature of 950° F.

Figure 13:
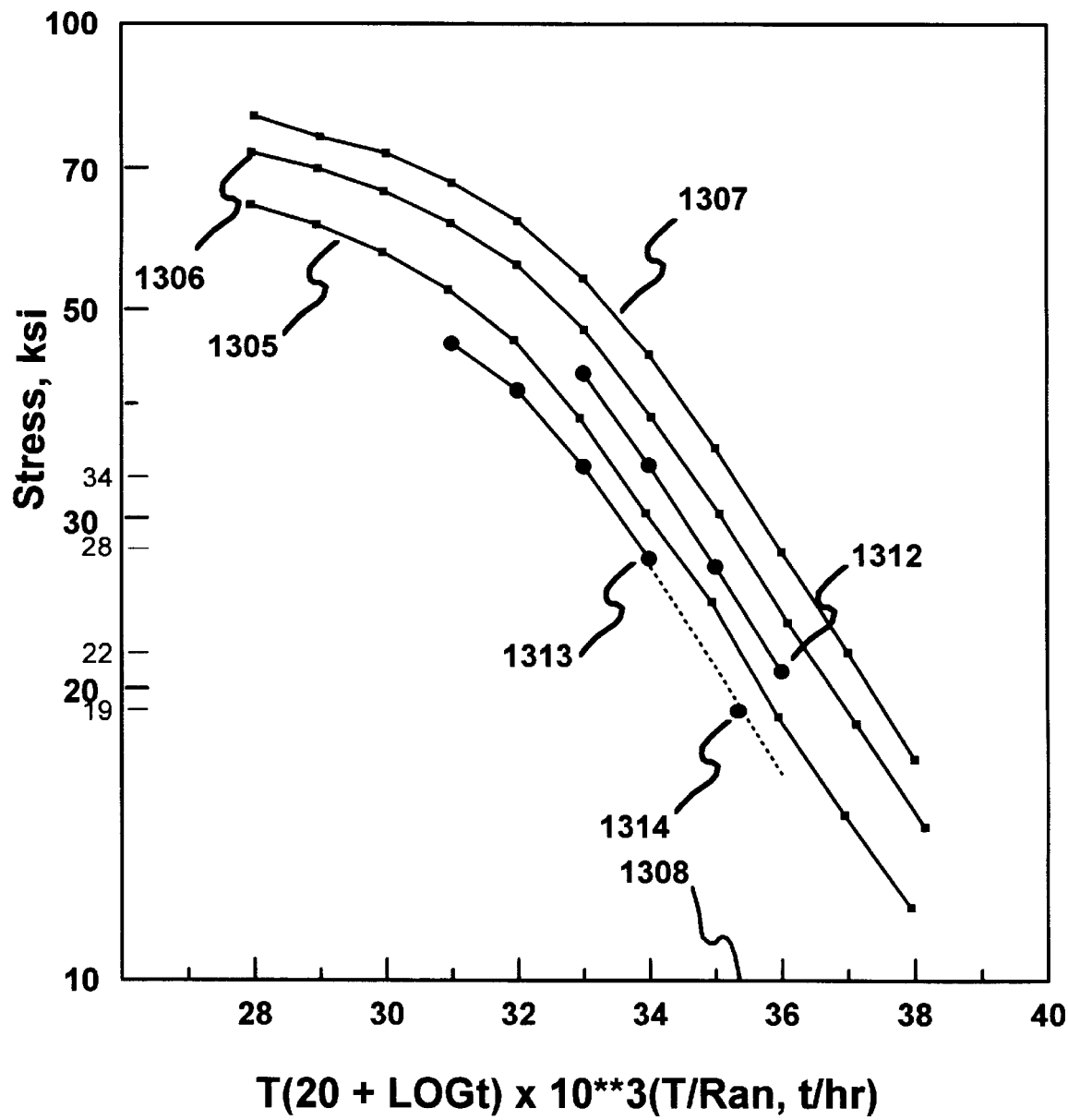
FIG. 13 is a graphical illustration similar to FIG. 12 wherein superimposed thereon are two additional data sets from a collection of cross-weld samples.

Referring now more specifically to FIG. 13, therein is shown essentially the same graphical illustration depicted in FIG. 12, with the addition thereto of two new features identified by graphs 1312 and 1313, wherein line 1312 represents a plot of data points obtained from stress-rupture tests made on crossweld test samples wherein said data points and the lines effecting same fall within the base metal scatter band and above minimum regression line 1305 and wherein the plot of the resulting crossweld tests obtained from stress-rupture tests on samples representing the plot at 1313, including extrapolated point 1314, in vertical alignment with the value of $P_{LM}$=35,674 is shown to be below (19 ksi) the strength of the rotor base metal (22 ksi), i.e., weaker than the rotor base metal. It will be appreciated that the supplemented graphical illustration in this FIG. 13 illustrates two possible outcomes when testing a series of cross-weld stress-rupture samples, i.e., samples which contain the base metal, the HAZ, and the buttering layer together with the hot wire weldments thereover when constructed according to standard dictates and tested to reveal the weakest zone in the weldment. As noted, the data gathered in representing line 1312 illustrates a weldment with the strength within the scatter band of the base metal, and accordingly no additional conservatism is required in the design of the weld repair placement of the fusion line in order to achieve the required design objective of reconstituted worn rotor sections or joined rotor sections having a predictable useful life of at least 200,000 hours at an operating temperature of a maximum of 950° F. On the other hand, the line represented by 1313 illustrates the results of a series of crossweld tests in which it turns out that the weldment is weaker than the rotor base metal and would allow for the maximum permissible design stress for the weldment of only about 19 ksi. It is noted that in this graphical illustration the test data for line 1313 required extrapolation of the line downwardly to 1314 in order to intersect with the vertical extension of 1308, i.e., the $P_{LM}$ at 200,000 hours at 950° F. This extrapolation is permissible in that the usual trend of specifics of materials in crossweld samples is generally parallel to the base metal curves. This notation is made in that if one plots such data points and the resulting extended line does not follow this usual behavior, i.e., generally parallel lines are not observed, then unfortunately more comprehensive testing would be required to establish the values of the curve in the particular stress parameter design range.

Figure 14:
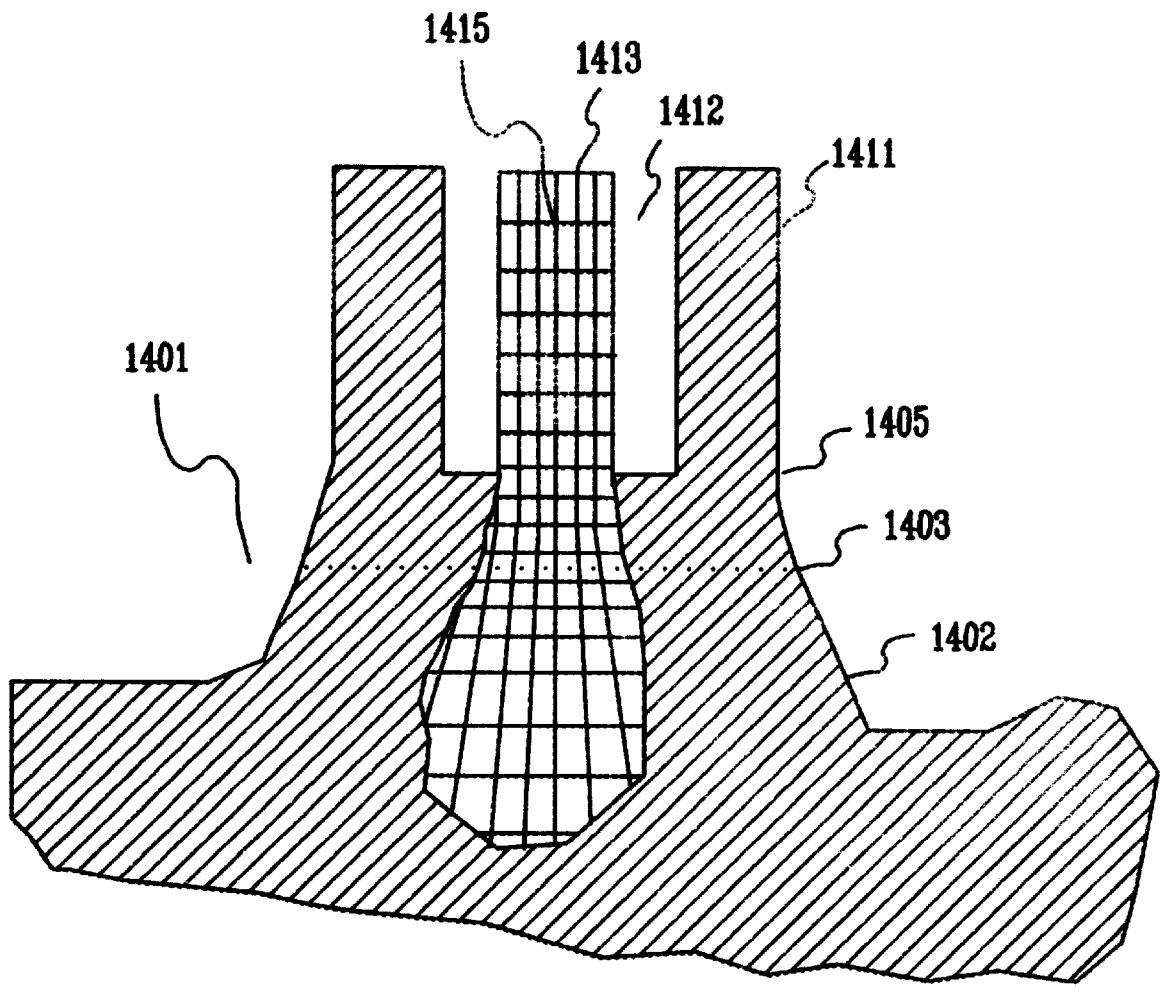
FIG. 14 is a partial, cross-sectional view of a control stage rotor of FIG. 1 with a portion of finite element mesh layout utilized therein for finite element stress analysis of the blade attachment region of the rotor for determination of optimum placement or location of the fusion line, said mesh shown in cut-away fashion.

Referring now more specifically to FIG. 14, therein is illustrated a partial, cross-sectional view of a control stage rotor turbine of the type generally shown in FIG. 1, supra, except that for the purposes of this illustration a portion of the usual cross-hatching has been cut-away to better show the salient feature herein vis-à-vis grid elements 1413 utilized in the finite element stress analysis wherein the control stage generally shown at 1401 comprises the rotor base metal generally shown at 1402, the location of the fusion line generally shown in phantom line mode at 1403, and the area of weldment thereover, generally shown at 1405. Also shown are steeple fingers, one of which is represented by 1411 and the turbine blade attachment slots generally illustrated at 1412. It will be further appreciated, that one of the junction points of the grid elements, i.e. nodes, is generally illustrated at 1415.

Figure 15:
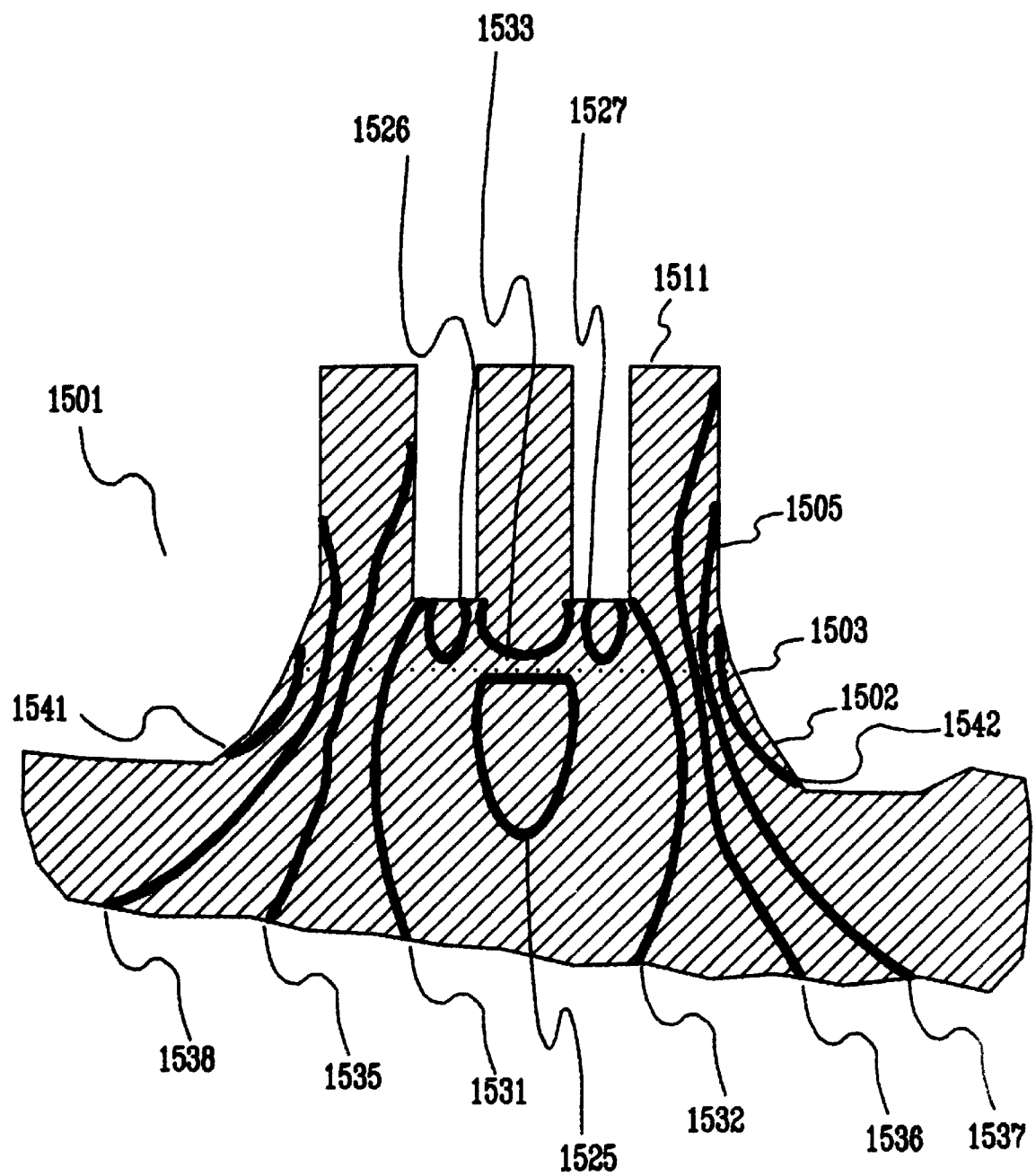
FIG. 15 is the partial, sectional view of the control stage rotor of FIG. 14 illustrating the radial stress contours obtained from the finite element model partially shown in FIG. 14.

Referring now more specifically to FIG. 15, therein is illustrated the turbine rotor control stage of FIG. 14 with the radial stress contours superimposed in bold lines thereon and obtained from analysis of the finite element model in FIG. 14. In the example shown herein the radial stresses were the largest of the principal stresses or the von Mises equivalent stress, in the particular vicinity of the fusion line generally illustrated (in phantom line mode) at 1503.

It is noted that the finite element mesh shown in partial cut-away section 1413 of FIG. 14, supra, would be completely drawn throughout the profile of the turbine rotor control stage shown thereon for purposes of obtaining the stress contours herein shown on FIG. 15. As also noted, in the particular example from which this FIG. 15 was derived, it was found that of the three principal stresses, i.e., the radial, the tangential, and the axial stresses, it was the radial stresses in the vicinity of the area of greatest concern, to wit, the fusion line shown in phantom line mode at 1503 which were the largest, and further that these radial stresses also exceeded the von Mises equivalence stresses. For example, the magnitude of the various radial stress contours associated therewith are as shown in Table 1, below:

TABLE 1

| STRESS CONTOURS | RADIAL STRESS MAGNITUDE |
| --- | --- |
| 1525, 1526, 1527 | 3.6 ksi |
| 1531, 1532, 1533 | 5.1 ksi |
| 1535, 1536 | 7.2 ksi |
| 1537, 1538 | 9.0 ksi |
| 1541, 1542 | 10.8 ksi |

From the illustration in this FIG. 15, and the data in Table 1 above, it will be appreciated that the highest stress in the fusion line, both in the base metal and in the HAZ region of the weldment is 10.8 ksi. Considering that it is a prime object of the instant invention to assure, from the Larson-Miller parametric data that the stresses in the vicinity of the fusion line will be sufficiently low to produce a service life of at least 200,000 hours and given that the rotor material comprising the base metal was a Cr—Mo—V alloy of class 8 and that the design operating temperature for the control rotor stage is 950° F., and realizing that the highest calculated stress in the vicinity of the fusion line including the juxtaposed HAZ obtained by FEM is in the form of radial stresses at a maximum of 10.8 ksi which is well below the 22 ksi minimum strength obtained from the Larson-Miller stress rupture data in FIG. 12, wherein the vertical line extending upwards from $P_{LM}$=35,674 represented by point 1208 to point 1209 on line 1205. Accordingly, the chosen location for the fusion line easily meets the criteria to assure the required design life of 200,000 service hours at temperature will be met. Note particularly the instant discovery that stress rupture data tests of the type illustrated at line 1312 in FIG. 13 are no longer required in the practice of the instant new short-cut procedure hereinafter disclosed for Cr—Mo—V (ASTM A-470 class 8) rotor steels. It is noted that ASTM A-470 class 3 (N—Mo—V) and class 7 (Ni—Cr—Mo—V) alloys each have their own unique band of stress-rupture behavior which is different than class 8 (Cr—Mo—V) but can be described graphically in a Larson-Miller plot similar to FIG. 12. However, it has been established that the weldment behavior for classes 3 and 7 is below the minimum line described by 1305 in FIG. 13 and is more appropriately described by a line such as 1313 but applied to either class 3 or 7 alloy plots as appropriate. It has been discovered that the line describing the stress rupture strength of weldments for classes 3 and 7 of ASTM A-470 has 80 percent of the minimum strength of the wrought alloy when welded by the processes contained in this disclosure. Therefore, additional crossweld testing is no longer required for repairs to classes 3 or 7 alloys; the design basis simply is based on 80 percent of the minimum strength for the applicable alloy as illustrated schematically in FIG. 13, line 1313, for class 8 alloy.

DESCRIPTION OF THE PREFERRED EMBODIMENTS

As will become apparent from detailed descriptions and illustrations of specifics relating to the design, methods, and technique of operation of the apparatus and processes of the instant invention as they relate to the different preferred embodiments directed to rotor repair, with one principal "gist" underlying the inventive concept herein is termed "buttering" and relates directly to practice of Embodiment One and Embodiment Two. In addition, practice of the instant invention also utilized the new improved weld wire alloy comprising Embodiment Four, relies on the proper placement of the fusion line, as in Embodiment Five of the instant invention with the practice of said Embodiment One being a precursor to utilization of the new design and special equipment and materials comprising Embodiment Three. A particular reason that the buttering is of such importance is that as previously explained, it establishes the interface between the prepared surface effected from a worn, or otherwise damaged rotor, which rotor is usually comprised of alloys designed and forged three or four decades ago, and which are not the most likely candidates for welding repair. Hence, it is important to have a suitable interface between the rotor base metal and the substantial amount of weldment laid down by the hot wire technique.

Embodiments One and Two. As welding emerged from an art to a science, welding researchers recognized that one of the essential variables was "heat input" and a resulting mixed metric and English unit of Joules per inch evolved as the accepted unit of measurement and control in the USA. Unfortunately, this measure of heat input fails to capture the major influence of the partitioning of energy into that which is required to melt the weld wire and the energy required to melt a portion of the base material. Recently, a more fundamental and accurate measure of heat input which accounts for this portioning of energy has been recognized and is embraced as the defining variable in this invention is called the "relative heat input." It is this measure of relative heat input that is most appropriate in differentiating the weld Technique described and taught in this invention from other prior art practices which have traditionally been used to weld Cr—Mo—V, Ni—Mo—V, and Ni—Cr—Mo—V rotor steels.

The importance of weld sequence, weld bead placement, and heat input in multipass welding processes particularly of the cold wire type, has long been recognized as crucial to the mechanical properties of the weldment. Most of the recent emphasis disclosed to the prior art has been placed on controlling the welding process parameters to minimize the deficiencies in the coarse-grained portion of the HAZ (CGHAZ). In relation to the mechanical properties of the base metal, the CGHAZ is deficient in ductility, yield strength, and impact notch toughness. These deficiencies directly relate to grain-size effects. By controlled-deposition, mainly cold wire welding processes, many prior art practitioners have sought either one or both of the following goals:

1a. Refine the grain structure in the CGHAZ to a grain size more characteristic of the base metal or the fine-grained portion of the HAZ (FGHAZ). To the extent that this grain refinement can be achieved, the deficiencies in the CGHAZ will be resolved.

2a. Temper the base metal HAZ and by continued control for the balance of the weld passes in a multipass weldment, create a weldment in which most of the metallurgical structure is tempered. The tempering reduces the hardness below the as-deposited condition with resultant improvement in ductility and, potentially, impact notch toughness.

For practice of the present invention, the auto-tempering of prior layers as in 2a, supra, by the heating action of subsequently "hotter" cold wire buttering layers, is not followed nor is followed in the hot wire operation since the high-deposition hot wire process subsequently utilized in the fifth and subsequent layers achieves neither grain refinement nor tempering of the HAZ. Furthermore, grain refinement of the subsequent layers of hot wire weld metal is not essential because the mechanical properties achieved with the instant new modified 9Cr weld metal alloy are substantially superior to the base metal without the necessity for grain refinement. Also, the prior art practice of using "hotter" cold wire passes is for all practical purposes, unnecessary, since subsequent tempering of the weldment during post-weld heat treatment (PWHT) is mandatory to minimize distortion, to lower residual stresses, to lower the hardness and strength of the weld metals to be more compatible with the base metal, and to improve the impact notch toughness.

The essential departure of the present invention from the teachings of the prior art is in the control of the relative heat input of the second, third, and fourth cold wire passes; but mainly the second pass since it achieves most of the grain refinement in the CGHAZ of the base metal. Accordingly, it has now been determined that a higher relative heat input for the second layer is inadvisable, and a preferred result in grain refinement is achieved by just the opposite practice; i.e., the use of a lower relative heat input. Indeed, the experiments performed in arriving at the present invention explored a range of relative heat inputs, both higher and lower, for the crucial second layer and the subsequent third and fourth layers. It was concluded that the preferred result in terms of grain refinement and smoothness in transition in hardness from the base metal through the HAZ and into the weld metal was achieved by using successively lower relative heat inputs for the second, third, and fourth layers and in some instances a fifth or even a sixth layer. It is this use of lower relative heat inputs for the second, third, and fourth layers of cold wire deposition relative to the relative heat input used for the first layer which markedly delineates the present invention from prior art practices.

As noted supra, the traditional concept of heat input does not take into account the amount of wire that is deposited—usually expressed in inches of wire per minute. In automated cold wire gas tungsten arc welding the amount of wire which is deposited is a critical factor both on the solidification of the weld and the dynamic heat distribution which results from the heat input. An equation that relates these additional values is necessary to adequately describe these relationships which take wire feed and travel speed into account. Since the travel speed was not varied with the cold wire gas tungsten arc welding, the travel speed is not a variable in the equation. The Electric Power Research Institute (EPRI) has conducted or sponsored extensive research on this very subject—Gandy and Findlan, "Temperbead Welding Repair of Low Alloy Pressure Vessel Steels: Guidelines", 1993. In this work, Gandy and Findlan, explain the need for the wire feed rate to be considered in gas tungsten arc welding. Development work on this equation goes at least as far back as 1983. The equations represent state-of-the-art technology and the results of the instant, new, and novel invention are expressed in the traditional heat input, the newer relative heat input and the EPRI Power Factor.

The Traditional Heat Input equation is described below:

$$\frac{\text{Heat Input}}{\text{Inch of Deposit}} = \frac{\text{Amperage} \times \text{Voltage} \times 60}{\text{Travel Speed}} = \frac{\text{Joule}}{\text{Inch}}$$

The Relative Heat Input (Keeping travel speed constant)

$$\frac{\text{Relative Heat Input}}{\text{Cubic Inch of Deposit}} = \frac{\text{Amperage} \times \text{Voltage} \times 60}{\text{Wire Feed Speed} \times \text{Wire Area}} = \frac{\text{Mjoule}}{(\text{Inch})^2}$$

$$\frac{\text{EPRI Power Factor}}{\text{Square Inches}} = \frac{\text{Amperage} \times \text{Voltage}}{\frac{\text{Wire Feed Speed} \times \text{Wire Area}}{\text{Travel Speed}}} = \frac{\text{Kwatt}}{(\text{Inch})^2}$$

The Relative Heat Input, if travel speed is held constant, and the EPRI Power Ratio both enable the welding process to control four important welding characteristics:

1. cross-sectional area of the deposited weld metal;
2. weld dilution;
3. total weld bead cross sectional area (weld nugget area); and
4. power input level for a given area of deposited metal.

This relationship was initially developed by Smartt, Key, and Alberry in the early 1980s. This correlation shows that a one-to-one relationship exists between the input parameters and the wire feed rate. Control of the power ratio value also controls the necessary input power to melt a given amount of deposited metal. A primary objective of utilizing this procedure for practice of the instant invention is to accurately control the relative heat input, so that there can be effected a smooth transition of hardness values across the HAZ of the base material. This provides the optimum starting hardness profile prior to the post weld stress relief of the entire weldment.

Extensive testing and parameter development for the instant invention has shown that slightly decreasing the relative heat input for each of the first three layers provides the most stable smooth transition hardness values of the HAZ in the base metal. This uniform hardness transition indicates that the resulting grain refinement is optimum in the HAZ of the base metal. This grain refinement, as well as the required subsequent post weld heat treatment, provides the finished weldment with the optimum room temperature and high temperature metallurgical and mechanical properties.

The essential departure of the present invention from prior art is the control of the relative heat input of the second, third, and fourth passes; but mainly the second pass, since it achieves most of the grain refinement in the coarse-grained HAZ of the base metal. Indeed, the experiments performed while making the present invention explored a range of relative heat inputs, both higher and lower, for the crucial second layer and subsequent third and fourth layers. It was concluded that the preferred result in terms of grain refinement and smoothness in transition in hardness from the base metal through the HAZ and into the weld metal was achieved by using lower relative heat inputs for the second, third, and fourth layers which is just opposite to the disclosures in prior art which relate to rotor welding.

Further, in the practice of the instant, new, and novel invention no side plates or run off tabs are required or used. Rather, a special weld puddle control technique is utilized to build a vertical geometry for later machining. This molten weld puddle control is manipulated by the exact placement of the wire into the molten weld puddle at a distance of about 1.5 wire diameters measured inboard from the centerline of the tungsten electrode to the vertical edge of either the original prepared surface or the ensuing vertical edge resulting from weld buildup thereon. This precise wire placement modifies the weld puddle dynamics to thereby control the solidification pattern and to thereby effect a vertical surface as the final weld geometry. This placement also allows the welding parameters to be maintained constant not only in the first four or five weldments by the cold wire process, but also subsequently during the entire hot wire gas tungsten arc welding process.

It should, of course, be readily apparent to those skilled in the art that the description herein of the welding procedures for both Embodiment One and Embodiment Two, particularly the buttering operation are effected subsequent to machining of the worn or fatigued rotor or rotor sections. In the case of Embodiment One, wherein the repair is to worn surfaces, the machining will generally be on the peripheral surface of one or more wheels such as the control stage of the rotor, etc., and further that the machining away of portions of such wheels is first dictated by the practice of Embodiment Five, discussed elsewhere, as it relates to proper fusion line placement so as to minimize the amount of weldment needed without sacrificing the useful life of the repaired unit when it is put back into operation. In addition, other considerations must be attended to before the first weldment is laid down. For instance, prior to welding, the prepared area is wrapped in heaters and insulated. Then the prepared area is preheated to a minimum of 400° F. A temperature range is maintained between 400° F. and 600° F., most preferably about 425° F. The purpose of the preheating step is to limit the rate of cooling in the weld and weld HAZ during the welding process and to minimize the tendency for hydrogen assisted cracking (cold cracking). The cold wire gas tungsten arc welding is then initiated. A sequential bead placement of the first layer is used to reduce the potential for a lack-of-fusion defect in or near the weld fusion line of the base metal. A low relative heat input is used on the first weld layer to reduce the size of the HAZ in the base metal. The second layer is also welded in a sequential pattern to assure that no lack-of-fusion defect will occur. In addition, the second layer is welded with a slightly lower relative heat input than that used to apply or deposit said first layer to put the optimum amount of heat a precise distance into the HAZ in the base metal to grain refine the HAZ in the base metal for optimum metallurgical and mechanical properties in the final post weld heat treated weldment.

The third and fourth layers of cold wire gas tungsten arc welds are welded with a relative heat input which conveniently may be greater than, equal to, or less than used for deposit of the second layer, it being understood that whatever the permutation used, all such inputs, i.e., for the second, third and fourth layers is less than that used for deposit of the first layer. The third and fourth, and if preferred, additional layers are used to build up the weld deposit to give a standoff distance so that the subsequent hot wire gas tungsten arc welding does not affect the HAZ in the base material. The preferred welding parameters developed during the work leading to this invention are shown in Table 2, below.

TABLE 2

WELDING PARAMETERS

| PARAMETER | 1$^{ST}$ LAYER | 2$^{ND}$ LAYER | 3$^{RD}$ & 4$^{TH}$ LAYERS | HOT WIRE |
|---|---|---|---|---|
| Primary Current, amps | 200–210 | 220–230 | 270–300 | 450–550 |
| Background Current, amps | 145–155 | 145–155 | 145–155 | NA |
| Secondary Current, amps | NA | NA | NA | 150–160 |
| Wire Size - Diameter, inch | 0.045 | 0.045 | 0.045 | 0.045 |
| Primary Wire Feed, in/min | 30–40 | 35–45 | 45–50 | 240–280 |
| Background Wire Feed, in/min | 25–35 | 25–35 | 35–45 | NA |
| Primary Voltage, volts | 9–11 | 9–11 | 9–11 | 12–14 |
| Background Voltage, volts | 8–10 | 8–10 | 8–10 | NA |
| Secondary Voltage, volts | NA | NA | NA | 8–10 |
| Cover Gas | Argon | Argon | Argon | Argon/Helium |
| Oscillation, inch | None | None | None | 0.25 |
| Electrode Size, inch | 0.125 | 0.125 | 0.125 | 0.25 |
| Travel Speed, in/min | 3.0–3.5 | 3.0–3.5 | 3.0–3.5 | 12.0–13.0 |
| Traditional Heat Input kj/in | 28–35 | 28–35 | 38–46 | 33–40 |
| Relative Heat Input Mj/cu in | 1.8–2.2 | 1.5–1.75 | 1.5–1.75 | 1.5–1.75 |

The following parameters represent those which are still more preferable to those given in Table 2, supra, and are most likely to assure the highest quality weld. These most preferred parameters are listed below in Table 3:

TABLE 3

PREFERRED WELD PARAMETERS

| PARAMETER | 1$^{ST}$ LAYER | 2$^{ND}$ LAYER | 3$^{RD}$ & 4$^{TH}$ LAYERS | HOT WIRE |
|---|---|---|---|---|
| Primary Current, amps | 210 | 225 | 290 | 510 |
| Background Current, amps | 150 | 150 | 150 | NA |
| Secondary Current, amps | NA | NA | NA | 155 |
| Wire Size - Diameter, inch | 0.045 | 0.045 | 0.045 | 0.045 |
| Primary Wire Feed, in/min | 35 | 40 | 50 | 250 |
| Background Wire Feed, in/min | 30 | 30 | 40 | NA |
| Primary Voltage, volts | 10 | 10 | 10 | 13 |
| Background Voltage, volts | 9 | 9 | 9 | NA |
| Secondary Voltage, volts | NA | NA | NA | 9 |
| Cover Gas | Argon | Argon | Argon | Argon/Helium |
| Oscillation, inch | None | None | None | 0.25 |
| Electrode Size, inch | 0.125 | 0.125 | 0.125 | 0.25 |
| Travel Speed in/min | 3.2 | 3.2 | 3.2 | 12.5 |
| Traditional Heat Input kj/in | 30–32 | 30–32 | 39–41 | 35–37 |
| Relative Heat Input Mj/cu in | about 1.8 | about 1.7 | about 1.7 | about 1.3 |

After the first four cold wire gas tungsten arc welding layers are deposited, the welding equipment is changed to the hot wire gas tungsten arc welding process it, of course, being realized that if otherwise required or desired a fifth, sixth, and even greater number of welding layers may be deposited. This hot wire process allows for a high quality high deposition rate weld. The wire is preheated prior to entering the weld puddle to allow for a higher deposition rate.

The hot wire welding technique is utilized after the buttering operation, hence, said buttering is the precursor therefore. In the practice of Embodiment One, after the proper location is established for placement of the fusion line and the worn surface and sufficient material thereunder is machined away to the cut line, which cut line essentially establishes the location of the resulting fusion line there just beneath and after the buttering thereover, the hot wire procedure is initiated. In the case of Embodiment Two, wherein surfaces extending radially from the center line of the axis of one or several rotor segments is to receive weldment, the same buttering procedure is added thereto after the broken or cracked irregular surfaces or the rotor segment end face(s) are preferably machined to a smooth polish, and subsequently the hot wire procedure is initiated.

Embodiment Three. As just explained, supra, the practice of either Embodiment One or Embodiment Two may be thought of as the precursor for the application of hot wire welding procedures and techniques of the type comprising Embodiment Three of the instant invention. Although the gas tungsten arc hot wire welding system generally has been used in the art for many years, the particular system comprising Embodiment Three of the instant invention is of a design and employs special equipment and materials which ensure that the hot wire weldments meet all of the objectives and specifications to put a worn or failed rotor back into useful operation for substantial periods of time, usually with a design criteria of 200,000 hours at design temperature. The practice of Embodiment Three of this invention involves a special procedure effected by a new piece of equipment, albeit, a rather simple one. Nevertheless, its use in the practice of this new invention is an absolute must and comprises the instant new gas cover shroud, which shroud allows the weld puddle to solidify at the proper rate and also prevents atmospheric contamination by oxidation of the weld puddle surface as well as the subsequently solidified but still relatively hot weld bead. In addition to the instant new gas cover shroud, it is also now been determined that although argon flood, or cover gas, is still a preferred material for the cold wire technique, a special range of helium to argon mixtures has been found to significantly influence the weld puddle dynamics particularly when introduced at the situs of the tungsten electrode. Proper selection of said mixture allows for the best control of both the size and the shape of the molten weld puddle, as well as the resulting bead or nugget. In addition, the instant new gas cover shroud not only contains the new mixture of flood gas, but is provided with a relatively fine mesh stainless steel distributed with a plurality of inlet orifices for introduction of additional argon gas, into the shroud.

In the development of the instant, new gas cover shroud it was determined that the hot wire weld puddle needs to be protected from the deleterious effects of atmospheric oxygen, not only while it is still molten, but after it has solidified at about 2800° F. and during future cooling until it has reached a temperature of equal to or less than 1000° F., more preferably equal to or less than about 900° F., and most preferable equal to or less than 800° F., it being understood that the target temperature is the lowest attainable considering all other conditions, parameters, and equipment. Accordingly, once such determination was made, it was further determined that about 60 seconds is required on rotors at least about 15 inches in diameter for the weld puddle to solidify and further cool down to the aforementioned operable minimum target temperature of 1000° F. or less, preferred minimum target temperature of 900° F. or less, and most preferred minimum target of 800° F. or less. From either Table 2 or Table 3, supra, it was known that the travel speed of the hot wire torch, relative to the rotor or other work surface, must be maintained at about 12 or 13 inches per minute. This travel speed is held constant relative to the work surface, so the rotational speed of different size rotors is varied to accommodate this parameter. Of course, this speed represents the relative movement such that the torch is held stationary and such relative speed is effected by the speed of rotation for a particular size rotor. Given that the heat sink provided by rotors which are about a foot and a quarter or more in diameter are essentially the same in regards to the cooling of the weld puddle, and given that it has been determined that such cooling of the weld puddle and further cooling of the solidified portion thereof down to about a temperature equal to or less than 800° F. takes approximately 60 seconds, empirically it can be seen that the length of the shroud must be about 12 inches in the length that it extends downstream from the juncture of the tungsten arc with the rotor surface. If desirable, of course, the shroud cover can be of a somewhat greater length so as to ensure that the desired objective of cooling the weldment below the predetermined temperature is safely met. The width of the shroud cover can vary according to the geometry of the surface being repaired as, for instance, in the case of a relatively narrow wheel, the shroud could be provided with a width sufficient such that side flaps can be provided so as to overlap the portion of the wheel or disc which has not been machined away, thereby ensuring a full enveloping arrangement. In other arrangements, the width of the shroud can be as little as about 3 inches, whereby the stainless steel mesh into which the cover gas is introduced, in turn, can be of about an equal width so as to ensure even distribution throughout the width of the weld puddle and approximately at least about an inch thereover on each side thereof. The rate of introduction of the special gas mixture into the electrode holding means, usually through an orifice disposed therearound, and the size of the mesh, as well as the distance of the mesh away from the rotor surface can also be influential in determining the desired width of the shroud assembly.

As noted above, the operation of the instant new shroud is further dependent on the introduction into the stainless steel mesh distributor of usually argon but sometimes the new special mixture of helium and argon. It has been further found that the mesh size of said distribution portion of the shroud assembly is critical. A mesh size of less than about 100 microns does not work well, and a mesh size of about 20 microns does not work at all. Apparently, such fine-size restricts gas flow. On the other hand, too large a mesh size, i.e., greater than about 200 microns does not effect the required mixing/distribution pattern. The helium:argon volumetric ratio that has been found desirable and necessary for practice of Embodiment Three of the instant invention, usually by introduction at the situs of the arc, can range from about 0.33 to about 3 and most preferably ranges from about 0.33 to about 0.5.

Embodiment Four. The newly developed weld wire alloy utilized in the instant invention for both the buttering operation, during the cold wire weldments, and subsequently during the hot wire weldments is a modified version of an alloy developed approximately 20 years ago for other purposes vis-à-vis the Oak Ridge material, supra. Basically, the instant, new modifications to the Oak Ridge material comprise 1) narrowing of the limits of several of the compositional elements, and 2) specifying limits for certain other elements not directly specified in the original alloy. In addition, there are other features of the instant new alloy as they relate, for instance, to chromium equivalent and aggregate content of lead, antimony, tin, and zinc content.

The new alloy comprising Embodiment Four of the instant invention is shown below in Table 4:

TABLE 4

| | |
|---|---|
| Carbon | C = 0.045 to 0.10% |
| Manganese | Mn = 0.40 to 0.60% |
| Phosphorus | P = 0.005% maximum |
| Sulfur | S = 0.005% maximum |
| Silicon | Si = 0.20 to 0.40% |
| Nickel | Ni = 0.10% maximum |
| Chromium | Cr = 8.00 to 9.00% |
| Molybdenum | Mo = 0.85 to 1.05% |
| Vanadium | V = 0.18 to 0.25% |
| Columbium | Cb = 0.06 to 0.10% |
| Nitrogen | N = 0.030 to 0.070% |
| Aluminum | Al = 0.02% maximum |
| Copper | Cu = 0.10% maximum |
| Titanium | Ti = 0.01% maximum |
| Cobalt | Co = 0.05% maximum |
| Boron | B = 0.001% maximum |
| Tungsten | W = 0.10% maximum |
| Arsenic | As = 0.010% maximum* |
| Tin | Sn = 0.005% maximum* |
| Antimony | Sb = 0.005% maximum* |
| Lead | Pb = 0.005% maximum* |
| Oxygen | O = 0.005% maximum |
| Hydrogen | H = 0.001% maximum |
| Iron | Fe = Balance |

In addition, it has been further determined that the residual combination or aggregate of limits for arsenic plus antimony plus tin plus lead is less than 0.010 percent (100 parts per million). This is in addition to the limits on each individual element listed, supra. Accordingly, and for example, if any two of these four elements are present at their allowable undeveloped maximum, then there can be no discernible amounts of the other two elements.

Still further, it now has been determined that The "Chromium Equivalent" which is necessary to control the final microstructure of both the buttering laid down by the cold wire technique and the substantial amount of additional weldment laid thereover by the gas tungsten arc hot wire welding system must be below about 11. The "Chromium Equivalent" is defined as the chromium percent by weight plus six times the silicon percent by weight plus four times the molybdenum percent by weight plus eleven times the vanadium percent by weight plus five times the columbium percent by weight plus nine times the titanium percent by weight plus one and a half times the tungsten percent by weight plus twelve time the aluminum percent by weight minus forty times the carbon percent by weight minus thirty times the nitrogen percent by weight minus four times the nickel percent by weight minus two times the manganese percent by weight minus the copper percent by weight.

In comparing the instant new wire alloy comprising Embodiment Four of the instant invention with that listed for the so-called Oak Ridge alloy, it may be seen that for the first thirteen elements many are either the same or substantially similar to one another. However, the subtle differences are important as attested by the following discussion. In particular, lower limits on phosphorus and sulfur are directed toward improved resistance to solidification cracking during welding, improved resistance to reheat cracking during post weld heat treatment, and improved resistance to embrittlement during service at high temperature. A further safeguard against solidification cracking during welding is achieved by the dual expedient of raising the lower limit of manganese while lowering the maximum limit on sulfur to ensure a high manganese-to-sulfur ratio. Since manganese has a strong affinity for sulfur, the ill effects of the latter are reduced by providing a high manganese-to-sulfur ratio which favors the formation of insoluble manganese sulfides which are well distributed throughout the weld metal and are innocuous. Lower limits on carbon are to improve resistance to hydrogen assisted cracking during welding and are more compatible with the lower post weld heat treatment temperatures (PWHT) applied for rotor repairs as contrasted to higher PWHT temperatures for the Oak Ridge alloy developed for pressure-vessel applications.

The purpose of these tight chemical, residual, and microstructural control limits is threefold:

1) Assure that the microstructure of the resultant weld metal which is deposited by either the cold wire or the hot wire method is predominantly tempered martensite which is essential for the fracture toughness of the completed weldment.
2) Minimize the tendency of the resulting weldment to center-line crack during the solidification process.
3) Assure retention of strength, toughness, and ductility of the repaired or reconstituted rotor during subsequent long-term service at operational temperatures; i.e. avoid embrittlement.

Embodiment Five. This embodiment of the present invention addresses the method selected and used to choose the location of the weld fusion line in order to avoid vulnerability to stress-rupture failure in the soft zone of the HAZ in a premature time. It is the specific goal to choose the location of the fusion line to assure a specific design margin for future service life of the weld repaired area. For future reference in this disclosure, a future service life of 200,000 hours or more will be used as a realistic example of the design margin, but the 200,000 hours is not intended as the literal future-life goal. Values of future service time for the weld repair either less than 200,000 hours or greater than 200,000 hours are chosen at the discretion of the organizations involved to satisfy the appropriate commercial, economic, and engineering constraints.

There is a potential conflict between the amount of weld metal to be deposited and the optimum location of the fusion line. For example, when the rotor configuration requires a weld restoration of the blade attachment region, removal of only the damaged material might permit a repair using the smallest amount of weld metal added thereto. However, such a repair might place the weld fusion line in a region of undesirably high stress. Therefore, this embodiment relates to criteria necessary for choosing or establishing the optimum location of the fusion line based on the results of certain stress analysis and the mechanical properties of the material.

To achieve the goal of 200,000 hour minimum stress-rupture life, the temperature and stresses must be compatible with a minimum time to failure of 200,000 hours based on statistical treatment of stress-rupture data. In the statistical context, the minimum strength is based on a 95 percent confidence limit; i.e., 95 percent of the observed stress-rupture failure data lies above the so-called minimum value.

In terms of temperature, there is often no option for altering the location of the weld fusion line since there is usually very little temperature difference from the bore to the outer surface. Therefore, the major option is to locate the fusion line in a region of lower stresses, thus assuring a service life of 200,000 hours or more. In this regard, it is the FEM for stress analysis and the interpretation of the associated results relative to the stress-rupture strength of the material which provides the requisite information.

In the FEM stress analysis, the rotor continuum is approximated by dividing it into discrete "finite elements" which are then subjected to numerical analysis for the stress distribution by one of the commercial software products such as ANSYS. NOTE: Any references made herein to materials and/or apparatus which are identified by means of trademarks, trade names, etc., are included solely for the convenience of the reader and are not intended as, or to be construed, an endorsement of said materials and/or apparatus. For the purposes of this invention, either a linear elastic or an elastic-plastic-creep FEM analysis may be performed. While the full complement of stresses are routinely computed by the FEM stress analysis (principal stresses, von Mises equivalent stresses, and Tresca equivalent stresses), it is either the maximum principal stresses or the von Mises equivalent stresses along the fusion line that are of relevance to the life estimate of the rotor.

From solid mechanics, any general stress state can be resolved into three orthogonal principal stresses in which no shear stress components exist on any of the faces of the "unit cube" in the orthogonal coordinate system. These principal stresses are identified as $\sigma_1$, $\sigma_2$, and $\sigma_3$. Algebraically, $\sigma_1$ is the largest principal stress and $\sigma_3$ the smallest; i.e., $$\sigma_1 \geq \sigma_2 \geq \sigma_3 \qquad \text{(Equation 1)}$$

From continuum mechanics, the von Mises equivalent stress can be defined from the three components of principal stress as:

$$\sigma_{vm}=(\sqrt{2}/2)[(\sigma_2-\sigma_1)^2+(\sigma_3-\sigma_1)^2+(\sigma_3-\sigma_2)^2]^{1/2} \qquad \text{(Equation 2)}$$

By specifying a "path" along the fusion line, the principal stresses and the von Mises equivalent stresses are available from the FEM analysis. The maximum stress anywhere along the fusion line, either $\sigma_1$ or $\sigma_{vm}$, is compared to the material properties, as described below, to meet the design criteria that ensures 200,000 hours minimum service life.

Stress analysis to ensure reliable performance of rotors used in rotating equipment is a traditional field of mechanical engineering. Prior to the advent of computers, most of the stress analyses used classical continuum mechanics methods with limited reliance on approximations using numerical methods. This mathematical approach obviously placed severe constraints on the analysis in terms of geometric complexity, path dependent loadings such as heatup/cooldown thermal transients, and modeling of complex material behavior such as strain hardening and creep. The emergence of the FEM in the 1960s provided a powerful new tool for the stress analyst. Today, the FEM is the mainstay for engineers performing stress analysis.

When the rotors operate at sufficiently low temperatures, creep is not a consideration and the life is potentially limited only by the fatigue characteristics of the material in relation to the design. Under the best circumstances, the life is essentially infinite; i.e., not limited by time of operation or number of cycles (startup, shutdown, overspeed, or cumulative number of revolutions). Even for operation below the creep range, the life may be limited by fatigue which initiates cracks in the regions of highest stress. This Embodiment Five of the present invention does not address the issue of limited life due to fatigue. Instead, it is directed to guarding against premature failure (less than 200,000 operating hours) in the region of the fusion line from stress rupture (creep).

The creep range of metals generally begins at about one-third of the absolute melting temperature and extends to the melting temperature. When subjected to sufficient stress in this temperature range, metals deform (creep) under constant stress until they develop cracks and eventually fracture (stress rupture). In the 1940s, experimenters in the creep field found that there were general correlations between stress, temperature, and time-to-rupture data. The most general correlations involved a well-behaved monotonic relationship between the logarithm of stress and a "time-temperature" parameter. Since the initial discovery of the concept, more than twenty-five time-temperature parameters have been developed for a variety of metals. One of the correlations which works well for rotor steels is the Larson-Miller time-temperature parameter defined mathematically as:

$$P_{LM}=(T+460)[C+\log_{10}(t_{rup})] \qquad \text{(Equation 3)}$$

where:
$P_{LM}$=The Larson-Miller time-temperature parameter
T=Temperature in °F.
C=The Larson-Miller constant, often 20 for steels and generally in the range of 12 to 35
$t_{rup}$=The time to rupture, Hours When the logarithm of stress is used as the abscissa (x value) and the Larson-Miller parameter, P, is used as the ordinate (y value), a collection of stress-rupture data from many different heats of the same material can be represented concisely as shown in FIG. 12, discussed supra. The specific data shown in FIG. 12 is from the open literature and is appropriate for the Cr—Mo—V rotor steels. From a statistical standpoint, the data can be bounded by a "minimum" and a "maximum" curve and has average behavior represented by the mean line. In this context, minimum and maximum represent the upper and lower 95 percent confidence limits; i.e., 95 percent of the observations lie above the minimum and 95 percent of the observations lie below the maximum. Hence, 90 percent of the observations are bounded between the minimum and the maximum. For purposes of the present invention, the minimum curve is the only one of relevance.

Accordingly, for identification of a preferred location of the weld fusion line for a weld repair to assure at least 200,000 hours of future service life, three pieces of data have heretofore been required to examine whether a particular location satisfies the future service life criteria:

1. A FEM stress analysis of the rotor at steady-state temperature and normal operating speed.
2. Graphical and/or numerical representation of the stress rupture data for the rotor base material with sufficient data to establish the statistical minimum curve, supra, resulting from a plot of the log of stress vs. the Larson-Miller parameter, (90 percent confidence band).
3. Stress-rupture data for so-called crossweld samples tested to include the base metal, HAZ, and weld metal in the sample. If these data lie above the minimum line of the 95 percent confidence band the design proceeds based on base metal minimum properties. If on the other hand, these data fall below the minimum of the base metal, a new "weldment minimum" line is drawn at or below the lowest weldment data and this becomes the new minimum for design purposes.

Of the three pieces of data which are required, supra, for determining the particular location which satisfies a future service life criteria, the first thereof which relates to the FEM of stress analysis has conveniently been effected during the development and work leading to the instant invention utilizing the ANSYS program. To those skilled in this art it will be appreciated that the procedure for a typical ANSYS analysis can be divided into the three distinct steps of building the "solid" model, then applying the loads in obtaining the solution, and finally reviewing the results. If, of course, the results obtained do not meet the design criteria for projected establishment of the fusion line situs then, unfortunately, the three steps must be repeated and, at the present state of development for computer programs of this type, the model must be rebuilt from scratch, i.e., there appear to be no convenient shortcuts in bumping elements and nodes into a new model structure. Accordingly, in the first step of creating the model geometry, the main objective thereof is to generate a finite element model including nodes and elements which adequately describe the model geometry. Generally there are two methods to grade such a finite element model: solid modeling and direct generation. With solid modeling, which is the preferred approach used herein, one describes the geometric boundaries of the model and then instructs the ANSYS program to automatically mesh the geometry with nodes and elements. In this approach the ANSYS program provides certain latitude for allowing the analyst to control the size and shapes of the elements that the program creates. The partial mesh is illustrated in a cut-away mode and is sufficient to show the important feature wherein the finite elements, the spacing between the nodes is much closer in the area of greatest concern, to wit, the fusion line at 1403. It is noted that the cross-sectional view of the rotor control stage as shown in FIG. 14 has only a portion thereof in cut-away fashion, illustrating the mesh grid (extending downward from 1413), it being realized that in actual practice the entire mesh grid over the entire partial, sectional view of the control stage is used for modeling. As one examines the mesh further and further away from the area juxtaposed the fusion line, it is appreciated that the finite elements or the node spacings become greater since the detail of stress loading further away from the fusion line is of lesser and lesser importance for purposes of establishing the optimum and proper position for the fusion line. It will be further appreciated by those skilled in the art that the first pick of the analyst for location of the fusion line at 1403 is of great significance since the next step of applying loads to the finite element mesh model must take into consideration the difference in materials on either side of the fusion line. Of particular significance is the fact that the base metal below the fusion line and the weld metal above the fusion line have significantly different properties in terms of their modulus of elasticity, their temperatures of operation, and finally their thermal coefficients of expansion. If these principal properties of the two material were not of significant differences then, of course, the mesh analysis could be run and a selection of the fusion line made after the fact. Unfortunately, even with the great sophistication of stress analysis procedure and the highly sophisticated computer program available for their execution, they still require remodeling if the first position selected for the fusion line does not satisfy the all important service life criteria supra. Accordingly, after the loads are applied to the finite element mesh model, and the action command for solve is initiated, the end results are displayed by either of the two available post processors of ANSYS. For purposes of the instant invention the "post1" command is utilized at the begin level to obtain desired contour displays which are available to the operator as multicolor stress bands, which for purposes of illustration of this invention are illustrated in FIG. 15 as the sets of stress contour lines illustrated in the 1525 through 1542 series.

In the development of the instant invention, and in particular while evaluating various finite element models utilized therein it has, for the first time, been discovered that if the proper buttering layer is laid down on the rotor body with the practice herein disclosed that then, and only then, the Larson-Miller stress rupture data, as illustrated for example in FIG. 12, may be utilized by itself in interpreting the location of the fusion line and that it is no longer necessary to obtain the crossweld sample data, as for example, those illustrated at lines 1312 and 1313 in FIG. 13. This elimination of the necessity to obtain crossweld test data has been brought upon by the instant new discovery that following the staged or reduced lower relative heat input of each successive weldment comprising the buttering layer results, in the case of the Cr—Mo—V rotor alloys of a resulting zone including the base metal, the HAZ, and the weldment thereabove of a stress rupture profile wherein the minimum strength thereof, usually in the HAZ, is above the 95 percent confidence limit represented by line 1205 in FIG. 12. This important discovery translates in an elimination of the considerable costs of obtaining the crossweld test samples, heretofore necessary in prior art procedures wherein full size rotors of such base metal must first be machined and welded and then cut up into pieces to obtain the typical crossweld samples having screw machined ends and a neck down portion therebetween, and wherein the machining is such that the fusion line must be positioned at the midpoint of said necked down portion and perpendicular to the axis of the crossweld sample can be eliminated. In other words, there is no longer a requirement to find a worn, broken, or otherwise damaged rotor comprised of such base metal and subsequently to expend considerable time, effort, and money in welding same according to some predetermined parameters and thence cutting same up into crossweld test samples and then subjecting same to loading for extended periods of time at temperature for obtaining therefrom stress rupture data of the type heretofore required. Also, it will be appreciated, that since approximately 80 to upwards of 90 percent of the steam turbine rotor fleet, both in this country and abroad, which has reached the critical end of its designed life span, i.e., about 40 years, is comprised of Cr—Mo—V materials, i.e., class 8 of ASTM A-40 type alloys.

Perhaps of somewhat lesser magnitude from the commercial standpoint, but still of great significance from the technological standpoint, is the further discovery that for class 3 Ni—Mo—V and class 7 Ni—Cr—Mo—V materials used originally to forge, some thirty or forty years ago, most of the remaining 10 to 20 percent of such steam turbine rotors that the strength in the base weld metal and the HAZ and across the fusion line into the weld metal resulting from the practice of the instant invention, particularly the buttering operation effected by the staged reduction or utilization of progressively lower relative heat inputs during the cold wire lay down of the generally four layers thereof effects a minimum strength of about 80 percent of the minimum 95 percent confidence line plot of a Larson-Miller stress rupture curve for each of those classes of alloys. With this second new discovery relating to the other materials of construction utilized to forge the remaining domestic substantially aged rotor fleet, it will be further appreciated that no crossweld test samples and data therefrom is required when, for example, worn surfaces thereon need to be repaired as in Embodiment One of the instant invention, or for that matter when rotor segments comprised thereof need to be joined by any manner or variations of Embodiment Two of the instant invention. In summary, the gist underlying the concept of the instant invention as taught in Embodiment Five is the elimination of one of the three pieces of data required by prior art procedures to examine whether or not a particular location satisfies future service life criteria for repaired worn rotor sections. More important, it will be appreciated that although the first of the three pieces of data, to wit, the FEM stress analysis requires considerable effort on the part of the analyst with the amount of effort required being inversely proportional to the skill of the analyst and his or her familiarity with the particular rotor configurations, the most expensive in terms of time, effort, and money of these three pieces, to wit, the stress rupture data from the crossweld samples, has hereby been eliminated and a new improved and most reliable short-cut Technique discovered wherein for all practical purposes only the base metal Larson-Miller stress rupture information need be used in connection with the results of a FEM stress analysis.

EXAMPLES

In order that those skilled in the art may better understand how the present invention can be practiced, the following examples are given by way of illustration only and are not necessarily by way of limitation, since numerous variations thereof will occur and will undoubtedly be made by those skilled in the art without substantially departing from the true and intended scope of the instant invention herein taught and disclosed.

Example I

During the very early stages of development of the cold wire gas tungsten arc welding process parameters of the instant invention, a relatively simple yet effective weld bead placement procedure was utilized. When using small weld test samples a staggered weld bead pattern seemed to be most effective for controlled the heat input, but subsequent sectioning of these samples show lack of proper fusion penetration. These lack of proper fusion penetrations were eliminated by welding the cold wire gas tungsten arc weld beads sequentially with the tip of the tungsten electrode positioned at the base of the previous weld bead. Also, at this time a large heat sink, a massive piece of metal to represent the large rotor shaft, was used to conduct the next series of tests. The better mock up improved the conditions of the experimental weld tests. All the parameters shown in Table 2, supra, were taken inside of the preferred ranges and metallugically examined for grain refinement and hardness profile transition from the base metal, HAZ, fusion line, and the weld metal.

The hardness in the HAZ was of primary concern to assure that grain refinement was complete, greater than 95 percent, and that the subsequent post weld heat treatment would provide the optimum room temperature and high temperature mechanical and metallurgical properties for the critical service for which these rotor shafts are used.

During the experimentation process, when the relative heat input was lower than the values listed in Table 2, supra, the weld profile was unacceptable for the weld beads to flow together (too cold) which causes a plethora of defects attributable to lack-of-proper fusion. Thus, a lower bound for the relative heat input was established as a starting parameter. The cold wire gas tungsten arc welding parameters were varied for the basic four layer process.

Early in the experimental process, the second weld layer was found to be the key element in both the hardness profile and grain refinement of the HAZ in the base material. When higher relative heat inputs were used (25 percent or higher) as some skilled in the art have disclosed, small coarse-grained areas remained that had prohibitively high hardness values of from about 60 to about 75 Brinell points higher than the remainder of the HAZ of the base material. Once this was determined, further experiments concentrated on lower relative heat inputs for the critical second layer.

When the relative heat input for the second layer was reduced to that of the first layer, acceptable results were obtained. However, the best uniform hardness transition and the most grain refinement surprisingly occurred with slightly less relative heat input on the second layer. Additional work was performed with varying the relative heat inputs on the third and fourth layers. It was determined that the third layer had a markedly lesser effect on the HAZ in the base material than did the second layer and that the fourth layer had even a lesser effect.

With this data as a basis, additional experiments were performed to repeat the initial results. Then the initial results were used at a starting point for the next phase of development. Metallurgical checks were made on each sample to confirm the amount of grain refinement and the hardness profile to find the optimum combination of factors for the first four layers of cold wire gas tungsten arc welding.

Example II

Once the cold wire parameters were optimized, as in Example I, supra, the hot wire portion of the welding process was initiated. The motivation for the hot wire route is to improve productivity by a deposition rate which is over six times that achieved by the cold wire process. The third and fourth cold wire layers were modified slightly to provide the correct height of the weldment prior to welding with the hot wire gas tungsten arc welding. Initial trials with the hot wire welding process showed that the bead contour had too large a height-to-width ratio in the solidified weld nugget which would cause lack-of-fusion similar to that found in the initial cold wire experiments. Additional, centerline solidification defects are more likely with a large height-to-width bead ratio.

To change the aspect ratio of the contour of the weld bead, several experiments were conducted. The wire feed rate, heat input, and gas flow rates were varied, nevertheless, the weld still did not have a good aspect ratio for high quality welding and centerline solidification cracking was detected by both the fluorescent magnetic particle testing and the series of ultrasonic tests that are required to assure a high quality weld repair. These indications, defects, and cracks were located, sized and removed for metallurgical examination. Small gas pockets and minor inclusions down to 0.005 inches were found. Locating and sizing by ultrasonics was accurate down to 0.015 inches. At this point helium gas was added to the gas mixture. This was the key to have a "flatter" weld contour that would produce a high quality repeatable weld. This improved the weld profile, but a high level of oxidation was observed on the as-deposited surface.

It was determined that the lack of proper gas coverage was the cause of the high level of weld oxidation. To overcome this problem a fine stainless mesh was first used as a cover for the weld. This did help somewhat, but required addition refinements. Accordingly, a shroud was formed around the stainless mesh and to the radius of the rotor shaft. This shroud provided adequate coverage to eliminate oxidation from the surface of the solidified weld puddle.

Subsequently, a number of tests were made using various wire feed rates. A high deposition rate was desired for speed of completing a desired weld, but quality could not be sacrificed for speed. Optimum feed rates were later determined and are as shown in Table 3, supra. Higher wire feed rates during the hot wire welding process will cause severe solidification centerline cracks in this alloy. This cracking was readily confirmed by both of the nondestructive testing techniques employed (surface magnetic particle and volumetric ultrasonic testing).

Additional metallurgical samples were evaluated from areas that were located by the nondestructive examinations. This added more data to correlate and size typical welding inclusions, indications, defects, and cracks in the experimental weldments. This led to better inspection techniques to assure the final high quality weldment.

During the time that the welding parameters were defined and optimized, nondestructive testing was effected to provide the assurance of high quality and was used to check every aspect of the process. Such nondestructive testing techniques were used to modify and control all the aspects of the welding parameters.

INVENTION PARAMETERS

After sifting and winnowing through the data supra, as well as other results and operations of our, new, novel, and improved technique, including methods and means for the effecting thereof, the operating variables, including the acceptable and preferred conditions for carrying out the instant invention are summarized below:

| Variable | Operating Limits | Preferred Operating Limits | Most Preferred Operating Limits |
|---|---|---|---|
| COLD WIRE WELDING BUTTERING | | | |
| Number of Layers | 3–12 | 3–6 | 4 |
| Percent Decrease in Relative Heat Input to the Second Layer compared to the First Layer | 5–30 | 10–20 | 10–20 |
| Weld Control Variables | Table 2 | Table 2 | Table 3 |
| HOT WIRE WELDING | | | |
| Composition of Cover Gas Introduced at Arc Situs (As Volumetric Ratio of Helium:Argon) | 0.33–3 | 0.33–1 | 0.33–0.5 |
| Composition of Cover Gas Introduced Through Distribution Device | Argon | Argon | Argon |
| Length of Shroud Which Contains Protective Atmosphere, Inches | 7–22 | 10–15 | 12–13 |
| Ratio of Shroud Length: Weld Puddle Width | 10–30 | 13–20 | 16–17 |
| Ratio of Shroud Width: Weld Puddle Width | 3–8 | 4–6 | 4–5 |
| Average Distance Between Work Surface and Shroud Diffuser, Inches | 0.5–3 | 0.5–2 | 0.75–1.5 |
| Wire Placement for Building Vertical Geometry (Distance Inboard from Electrode) | 1–2 Wire Diameters | About 1.5 Wire Diameters | About 1.5 Wire Diameters |
| Distribution Device Mesh Size, Microns | 50–300 | 75–250 | 100–200 |
| Temperature Target for Weld Bead Exiting the Shroud, °F. | ≦1000 | ≦900 | ≦800 |
| Weld Control Variables | Table 2 | Table 2 | Table 3 |
| WELD WIRE ALLOY | | | |
| Chemical Composition | Table 4 | | |
| Residuals (As + Sb + Sn + Pb), ppm | ≦250 | ≦175 | ≦100 |
| Chromium Equivalent | 8–12 | 8–11 | 10–11 |

-continued

| Variable | Operating Limits | Preferred Operating Limits | Most Preferred Operating Limits |
|---|---|---|---|
| FUSION LINE PLACEMENT | | | |
| Minimum Design Service Life (in 1000 Hours) | ≧200 | | |
| Larson-Miller Parameter for Base Metal Data (Constant = 20) | 33,000–37,000 | | |
| Maximum Permissible Design Stress (A-470 Class 8 Alloy) | 100% of Ordinate at Intercept of Larson-Miller Lower 90% Confidence Band for Base Metal | | |
| Maximum Permissible Design Stress (A-470 Classes 3 & 7 Alloy) | 80% of Ordinate at Intercept of Larson-Miller Lower 90% Confidence Band for Base Metal | | |

What we claim as new and desire to secure by Letters Patent of the United States is:

1. A process for repairing a worn surface on a ferrous alloy rotor component comprising:
   (a) providing a rotor component having a worn surface thereon, said rotor component comprising an ASTM ferrous alloy of the A-470 type;
   (b) depositing a first layer of weld metal on said worn surface;
   (c) depositing a second layer of weld metal on said first layer with a lower relative heat input than that used to apply said first layer;
   (d) depositing a third layer of weld metal on said second layer with a lower relative heat input than that used to apply said first layer;
   whereby the depositing of said first three layers of weld metal on said worn surface effects a buttering layer thereon; and
   (e) subsequently depositing on said buttering layer of weld metal a plurality of layers of build-up weld metal one upon the other.

2. The process of claim 1 further comprising depositing from about one to about one half dozen additional layers of weld metal on said third layer with a relative heat input equal to or less than that used to apply said first layer, whereby the depositing of said first three and said additional one to about one half dozen layers of weld metal on said worn surface effects a buttering layer thereon.

3. The process of claim 2, wherein said depositing steps (b) through (d) comprise gas tungsten cold wire arc welding and wherein said depositing of said plurality of build-up layers of weld metal on said buttering layer in step (e) thereof comprise gas tungsten arc hot wire welding.

4. The process of claim 3, wherein argon is utilized as a cover gas over the weld puddle effected during the depositing of each of the first four to about nine layers comprising said buttering layer, and wherein a mixture of helium and argon in a volumetric ratio of helium:argon ranging from about 0.33 to about 3 utilized as the cover gas over at least that portion of each weld puddle at a first situs juxtaposed the arc effected during the depositing of said plurality of layers of weld metal on said buttering layer, and further wherein argon is introduced onto said mixture of helium and argon at a second situs juxtaposed the weld puddle and spaced apart from said first situs.

5. The process of claim 4, wherein the volumetric ratio of the helium:argon in said mixture introduced at said first situs ranges from about 0.33 to about 1.

6. The process of claim 5, wherein said volumetric ratio ranges from about 0.33 to about 0.5.

7. The process of claim 5, wherein said helium and argon is maintained as a protective cover over the weld puddle during the cooling and resulting solidification thereof until the bead effected by the resulting solidified puddle is cooled to a temperature ranging upwards to about 1000° F.

8. The process of claim 7, wherein maintaining said helium and argon over the weld puddle and over at least a portion of the bead resulting from the solidification thereof is effected with physical barrier means extending transversely over said rotor a distance predetermined sufficient for maintaining said protective cover over the resulting solidified bead until it is cooled down to at least said temperature range.

9. The process of claim 8, wherein the width of said physical barrier means is arranged in a direction generally parallel to the axis of said rotor component and ranges from about 3 to about 8 times the average width of said weld puddle.

10. The process of claim 9, wherein the width of said physical barrier means is effected at about 5 times the average width of said weld puddle.

11. The process of claim 8, wherein the difference in values for the relative heat inputs used to apply said second layer relative to said first layer, and used to apply said additional one to about eight layers comprising said buttering layer relative to said first layer ranges upwards to about 30 percent.

12. The process of claim 11, wherein said difference in values ranges upwards to about 20 percent.

13. The process of claim 8, wherein the weldments comprising said buttering layer and said deposits comprising said plurality of build-up layers deposited on said buttering layer by the hot wire procedure comprises about 0.045 to about 0.10 weight percent C, about 0.40 percent to about 0.60 percent Mn, in amounts up to about 0.005 percent P, in amounts up to about 0.005 percent S, about 0.20 percent to about 0.40 percent Si, in amounts up to about 0.10 percent Ni, about 8.00 percent to about 9.00 percent Cr, about 0.85 percent to about 1.05 percent Mo, about 0.18 percent to about 0.25 percent V, about 0.06 percent to about 0.10 percent Cb, about 0.030 percent to about 0.070 percent N, in amounts up to about 0.02 percent Al, in amounts up to about 0.10 percent Cu, in amounts up to about 0.01 percent Ti, in amounts up to about 0.05 percent Co, in amounts up to about 0.001 percent B, in amounts up to about 0.10 percent W, in amounts up to about 0.010 percent As, in amounts up to about 0.005 percent Sn, in amounts up to about 0.005 percent Sb, in amounts up to about 0.005 Pb, upwards to about 0.005 percent O, in amounts up to about 0.001 percent H, and the balance being Fe.

14. The process of claim 7, wherein said providing step comprises selecting a steam turbine component comprising a rotor having a wheel with a worn portion attached thereto, and wherein said providing step further comprises mechanically removing the worn portion attached to said wheel together with at least a portion of said wheel to produce a prepared surface subsequent to first determining the optimum placement of the fusion line effected by said first depositing step, whereby the two criteria for optimizing said placement include providing for a useful life of the repaired, worn surface of at least 200,000 hours and further includes operation of the repaired, worn surface at temperatures which were originally designed for the operation of said rotor component.

15. The process of claim 14, wherein said depositing step comprises welding a first bead transversely across said rotor component on said prepared surface.

16. The process of claim 15, wherein said welding step further comprises welding a second bead on said prepared surface transversely across said rotor and juxtaposed said first bead.

17. The process of claim 1, wherein said depositing steps (b) through (d) comprise gas tungsten cold wire arc welding and wherein said depositing of said plurality of build-up layers of weld metal on said buttering layer in step (e) thereof comprise gas tungsten arc hot wire welding.

18. The process of claim 17, wherein argon is utilized as a cover gas over the weld puddle effected during the depositing of each of the first three layers comprising said buttering layer, and wherein a mixture of helium and argon in a volumetric ratio of helium:argon ranging from about 0.33 to about 3 is utilized as the cover gas over at least that portion of each weld puddle at a first situs juxtaposed the arc effected during the depositing of said plurality of build-up layers of weld metal on said buttering layer, and further wherein argon is introduced onto said mixture of helium and argon at a second situs juxtaposed the weld puddle and spaced apart from said first situs.

19. The process of claim 18, wherein the volumetric ratio of the helium:argon in said mixture introduced at said first situs ranges from about 0.33 to about 1.

20. The process of claim 19, wherein said volumetric ratio ranges from about 0.33 to about 0.5.

21. The process of claim 19, wherein said helium and argon is maintained as a protective cover over the weld puddle during the cooling and resulting solidification thereof until the bead effected by the resulting solidified puddle is cooled to a temperature ranging upwards to about 1000° F.

22. The process of claim 21, wherein maintaining said helium and argon over the weld puddle and over at least a portion of the bead resulting from the solidification thereof is effected with physical barrier means extending transversely over said rotor a distance predetermined sufficient for maintaining said protective cover over the resulting solidified bead until it is cooled down to at least said temperature range.

23. The process of claim 22, wherein the difference in values for the relative heat inputs used to apply said second layer relative to said first layer, and used to apply said third layer relative to said first layer ranges upwards to about 30 percent.

24. A process of forming a turbine rotor from separate rotor segments comprised of ASTM Type A-470 alloy including classes 3, 7, and 8 thereof comprising:
   (a) providing a first rotor segment having an outer surface and a first end face;
   (b) providing a second rotor segment having an outer surface and a second end face;
   (c) depositing a first layer of weld metal on said first end face;
   (d) depositing a second layer of weld metal on said first layer with a lower relative heat input than that used to apply said first layer;
   (e) depositing, one upon the other, from about one to about eight additional layers of weld metal on said second layer with a lower relative heat input than that used to apply said first layer;
   whereby the depositing of said three to about ten layers of weld metal on said first end face effects thereon a first buttering layer;
   (f) subsequently depositing on said first buttering layers of weld metal a plurality of layers of weld metal one upon the other;

(g) depositing a first layer of weld metal on said second end face;

(h) depositing a second layer of weld metal on said first layers on said second end face with a relative heat input lower than that used to apply said first layer thereon;

(i) depositing, one upon the other, from about one to about eight additional layers of weld metal on said second layer over said first layer on said second end face with a lower relative heat input than that used to apply said first layer;

whereby the depositing of said three to about ten layers of weld metal on said second end face effects thereon a second buttering layer;

(j) subsequently depositing on said second buttering layer of weld metal a plurality of layers of weld metal one upon the other;

(k) machining both said buttering layer on said first end face and on said second end face to provide smooth surfaces thereon;

(l) aligning said first and said second rotor segments with said end faces confronting each other in spaced adjacent relationship to provide a welding root opening therebetween;

(m) welding said first and said second rotor segments together across said welding root opening to form a juncture weld, with a portion of said juncture weld extending beyond the outer surfaces thereof, and (n) machining said juncture weld to form a smooth surface thereof complementary with the outer surface of said first and said second rotor segments.

25. The process of claim 24, wherein said depositing steps (c) through (e) and (g) through (i) comprise gas tungsten cold wire arc welding and wherein said depositing of said plurality of build-up layers of weld metal on said buttering layers in steps (f) and (j) thereof comprise gas tungsten arc hot wire welding.

26. The process of claim 25, wherein argon is utilized as the cover gas over the weld puddle effected during the depositing of each of the three to about ten layers comprising said buttering layer on each said first end face and on said second end face and wherein a mixture of helium and argon gas in a volumetric ratio of helium:argon in the range from about 0.33 to about 3 is utilized as the cover gas over at least a portion of each weld puddle at a first situs juxtaposed the arc effected during the depositing of said plurality of layers of weld metal on each of said buttering layers, and further wherein argon is introduced onto said mixture of helium and argon at a second situs juxtaposed the weld puddle and spaced apart from said first situs.

27. The process of claim 26, wherein the volumetric ratio of the helium:argon in said mixture introduced at said first situs ranges from about 0.33 to about 1.

28. The process of claim 27, wherein said volumetric ratio ranges from about 0.33 to about 0.5.

29. The process of claim 26, wherein said helium and argon is maintained as a protective cover over the weld puddle during the cooling and resulting solidification thereof until the bead effected by the resulting solidified puddle is cooled to a temperature equal to or less than about 1000° F.

30. The process of claim 29, wherein the resulting bead is cooled down to a temperature ranging upwards from about 800° F. to about 1000° F.

31. The process of claim 29, wherein maintaining said helium and argon over the weld puddle and over at least a portion of the bead resulting from the solidification thereof is effected with physical barrier means extending transversely over said rotor a distance predetermined sufficient for maintaining said protective cover over the resulting solidified bead until it is cooled down to at least said temperature range.

32. The process of claim 31, wherein the width of said physical barrier means is arranged in a direction generally parallel to the axis of said rotor component and ranges from about 3 to about 8 times the average width of said weld puddle.

33. The process of claim 31, wherein the width of said physical barrier means is effected at about 5 times the average width of said weld puddle.

34. The process of claim 31, wherein the difference in values for the relative heat inputs used to apply said second layer relative to said first layer on each said first end face and said second end face and comprising said first and said second buttering layers, ranges upwards to about 30 percent.

35. The process of claim 34, wherein the weldments by the cold wire procedure comprising said buttering layer on each of said first and said second end faces and said deposits comprising said plurality of layers deposited thereover by the hot wire procedure comprises about 0.045 to about 0.10 weight percent C, about 0.40 percent to about 0.60 percent Mn, in amounts up to about 0.005 percent P, in amounts up to about 0.005 percent S, about 0.20 percent to about 0.40 percent Si, in amounts up to about 0.10 percent Ni, about 8.00 percent to about 9.00 percent Cr, about 0.85 percent to about 1.05 percent Mo, about 0.18 percent to about 0.25 percent V, about 0.06 percent to about 0.10 percent Cb, about 0.030 percent to about 0.070 percent N, in amounts up to about 0.02 percent Al, in amounts up to about 0.10 percent Cu, in amounts up to about 0.01 percent Ti, in amounts up to about 0.05 percent Co, in amounts up to about 0.001 percent B, in amounts up to about 0.10 percent W, in amounts up to about 0.010 percent As, in amounts up to about 0.005 percent Sn, in amounts up to about 0.005 percent Sb, in amounts up to about 0.005 Pb, in amounts up to about 0.005 percent O, in amounts up to about 0.001 percent H, and the balance being Fe.

36. A method of repairing a cracked or gouged rotor shaft comprising the steps of:

(a) forming a narrow groove in the region of the crack or gouge having a sufficient length, width, and depth to completely remove the crack or gouge;

(b) providing a ferrous-based welding filler metal (c) preheating the groove;

(d) depositing the welding filler metal in the groove using a narrow groove welding technique, until the filler metal fills the groove; and (e) postheating the filled groove;

wherein said welding filler metal comprises an alloy of about 0.045 to about 0.10 weight percent C, about 0.40 percent to about 0.60 percent Mn, upwards to about 0.005 percent P, upwards to about 0.005 percent S, about 0.20 percent to about 0.40 percent Si, upwards to about 0.10 percent Ni, about 8.00 percent to about 9.00 percent Cr, about 0.85 percent to about 1.05 percent Mo, about 0.18 percent to about 0.25 percent V, about 0.06 percent to about 0.10 percent Cb, about 0.030 percent to about 0.070 percent N, upwards to about 0.02 percent Al, upwards to about 0.10 percent Cu, upwards to about 0.01 percent Ti, upwards to about 0.05 percent Co, upwards to about 0.001 percent B, upwards to about 0.10 percent W, upwards to about 0.010 percent As, upwards to about 0.005 percent Sn, upwards to about 0.005 percent Sb, upwards to about 0.005 percent Pb, upwards to about 0.005 percent O, upwards to about 0.001 percent H, and the balance being Fe.

37. In a new and improved composition of matter imminently suitable as a weld wire alloy and including:

Silicon=0.20 to 0.40%
Nickel=0.10% maximum
Chromium=8.00 to 9.00%
Molybdenum=0.85 to 1.05%
Vanadium=0.18 to 0.25%
Columbium=0.06 to 0.10%
Nitrogen=0.030 to 0.070%
Aluminum=0.02% maximum;

the improvement in combination therewith for effecting improved resistance to solidification cracking during welding, improved resistance to reheat cracking during post weld heat treatment, and improved resistance to embrittlement during service at high temperature, which improvement includes adjusting the amount of C, Mn, P, and S therein to the following compositions:

Carbon=0.045 to 0.10%
Manganese=0.40 to 0.60%
Phosphorus=0.005% maximum
Sulfur=0.005% maximum;

and wherein said new and improved new weld wire alloy further comprises the following compositions:

Copper=0.10% maximum
Titanium=0.01% maximum
Cobalt=0.05% maximum
Boron=0.001% maximum
Tungsten=0.10% maximum
Arsenic=0.010% maximum
Tin=0.005% maximum
Antimony=0.005% maximum
Lead=0.005% maximum
Oxygen=0.005% maximum
Hydrogen=0.001% maximum
Iron=Balance.

38. The new weld wire alloy composition of claim 37, wherein the aggregate of residual arsenic, antimony, tin, and lead does not exceed about 0.010 percent.

39. The new weld wire alloy composition of claim 38, wherein the chromium equivalent thereof is less than about 11.

40. An improved process for repairing a worn surface of an A-470 type alloy turbine rotor component comprising the steps of:

(a) mechanically removing at least a portion of said worn surface, the mechanical removing being sufficient to produce a prepared surface at a predetermined location on said turbine component for later establishing a first projected situs of a fusion line, said situs of said fusion line being optimized so that subsequent rebuilding of the removed portion of said worn surface by means of weldment thereover and subsequent machining thereof yields a repaired turbine component characterized by having a predictable service life of at least 200,000 hours during subsequent operation at design temperature;

(b) depositing sequentially onto said prepared surface at least three layers of weld metal thereon, one upon another and applied by the tungsten arc cold wire method wherein the deposit of each of the last two of said at least three layers is at a lower relative heat input than the relative heat input used to deposit the first layer, thereby producing a buttering layer;

(c) depositing over said buttering layer a predetermined number of subsequent layers of weldment by the tungsten arc gas hot wire method;

(d) isolating from the atmosphere the weld puddle formed during said deposit of said subsequent layers by application thereover of a mixture of helium and argon gas wherein the volumetric ratio of helium:argon ranges from about 0.33 to about 3;

(e) machining at least a portion of the resulting buildup of cold wire and hot wire weldments to effect said rebuilding; and (f) establishing the situs of said fusion line by:
(1) generating a finite element solid model having incorporated therein a projected fusion line situs;
(2) subjecting said model to load application for effecting contour displays of the three principal stresses comprising axial, tangential, and radial stress and the von Mises equivalent stress;
(3) establishing the maximum permissible design stress at the intercept of the curve for the lower 90 percent confidence band of the logarithm of stress versus the Larson-Miller parameter ($P_{LM}$) for said A-470 type alloy at the design operating temperature and the design operating time; and
(4) evaluating the ratio of the maximum stress established in step (3) supra with the largest value of either the three principal stresses or the von Mises equivalent stress established in step (2) supra whereby the projected situs of the fusion line is optimized when such ratio is equal to or greater than one.

41. The process of claim 40, wherein the composition of said turbine rotor component comprises class 8 of said ASTM A-470-type alloy.

42. The process of claim 41, wherein said Larson-Miller parameter ($P_{LM}$) ranges from about 33,000 to about 37,000.

43. The process of claim 40, wherein the composition of said turbine rotor component comprises class 7 of said ASTM A-470 type alloy, and wherein said evaluating step (f)(4) further comprises reducing the maximum permissible design stress established in step (f)(3) by 20 percent.

44. The process of claim 43, wherein said Larson-Miller parameter ($P_{LM}$) ranges from about 33,000 to about 37,000.

45. The process of claim 40, wherein the composition of said the turbine rotor component comprises class 3 of said ASTM A-470 type alloy, and wherein said evaluating step (f)(4) further comprises reducing the maximum permissible design stress established in step (f)(3) by 20 percent.

46. The process of claim 45, wherein said Larson-Miller parameter ($P_{LM}$) ranges from about 33,000 to about 37,000.

47. The process of claim 40, wherein the ratio in evaluating step (f)(4) is less than 1, thereby requiring establishment of a second projected fusion line situs, whereby the ratio of the distance from said first projected situs from the axis of said turbine rotor component to the distance of said second projected situs ranges from about 0.90 to about 1.10 and wherein said generating, said subjecting, said establishing, and said evaluating substeps (1) to (4) of step (f) are repeated.

48. The process of claim 47, wherein the ratio in said evaluating (f)(4) is, after said establishment of said second projected fusion line situs is still less than one, whereby is required the establishment of additional projected fusion line situses until said ratio in said evaluating step (f)(4) is equal to or greater than one.

* * * * *